United States Patent [19]
Moteki et al.

[11] Patent Number: 6,108,040
[45] Date of Patent: *Aug. 22, 2000

[54] MOTION VECTOR DETECTING METHOD AND SYSTEM FOR MOTION COMPENSATING PREDICTIVE CODER

[75] Inventors: Masataka Moteki, Yokohama; Yoshiharu Uetani; Tadahiro Oku, both of Kawasaki; Tadaaki Masuda, Tokyo-to; Tomoo Yamakage, Kawasaki; Toshinori Odaka, Yokohama, all of Japan

[73] Assignee: Kabushiki Kaisha Toshiba, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/508,134

[22] Filed: Jul. 27, 1995

[30] Foreign Application Priority Data

Jul. 28, 1994 [JP] Japan ..................................... 6-176523

[51] Int. Cl.⁷ ..................................................... H04N 7/32
[52] U.S. Cl. ........................................... 348/416; 348/699
[58] Field of Search ..................................... 348/400, 401, 348/402, 409, 412, 413, 415, 416, 699; 382/236; 386/111

[56] References Cited

U.S. PATENT DOCUMENTS

| | | | |
|---|---|---|---|
| 5,047,850 | 9/1991 | Ishii et al. | 348/699 |
| 5,072,293 | 12/1991 | De Haan et al. | 348/699 |
| 5,369,449 | 11/1994 | Yukitake et al. | 348/699 |
| 5,428,403 | 6/1995 | Andrew et al. | 348/699 |
| 5,541,661 | 7/1996 | Odaka et al. | 348/416 |
| 5,647,049 | 7/1997 | Odaka et al. | 348/416 |
| 5,742,344 | 4/1998 | Odaka et al. | 348/416 |
| 5,754,231 | 5/1998 | Odaka et al. | 348/390 |

FOREIGN PATENT DOCUMENTS

| | | | |
|---|---|---|---|
| 0 484 140 A2 | 10/1991 | European Pat. Off. | H04N 7/32 |
| 0 541 389 A2 | 11/1992 | European Pat. Off. | H04N 7/13 |
| 0 542 474 A2 | 11/1992 | European Pat. Off. | H04N 7/13 |

OTHER PUBLICATIONS

Puri, et al., "Adaptive frame/field motion compensated video coding," vol. 5, Nos. 1–2, pp 39–58, Feb. 1993.

Zhang, et al., Predictive Block–Matching Motion Estimation Schemes for Video Compression—Part II Inter–freme Prediction of Motion Vectors, pp 1093–1095, 1991.

*Primary Examiner*—Vu Le
*Attorney, Agent, or Firm*—Foley & Lardner

[57] ABSTRACT

In a method of detecting motion vector data indicative of motion of a partial area in an input picture from any area on a reference picture, a first distortion between a partial area constructed by fields of the input picture and a partial area constructed by fields of the reference picture is calculated as a first evaluation value; a position of the partial area constructed by the fields of the reference picture at which the first evaluation value becomes the minimum value is detected; a search window on a frame of the reference picture is set on the basis of a detected position of the partial area constructed by the fields of the reference picture previously detected; and a second distortion between a partial area constructed by a frame in the set search window and a partial area constructed by a frame of the input picture is calculated as a second evaluation value, and a position of the partial area constructed by the frame of the reference picture at which the second evaluation value becomes the minimum value is detected. Therefore, the frame vectors can be detected on the basis of the field vector detection positions, so that the amount of calculations required to retrieve frame vectors can be reduced markedly, without degrading the detection precision of the frame vectors.

14 Claims, 16 Drawing Sheets

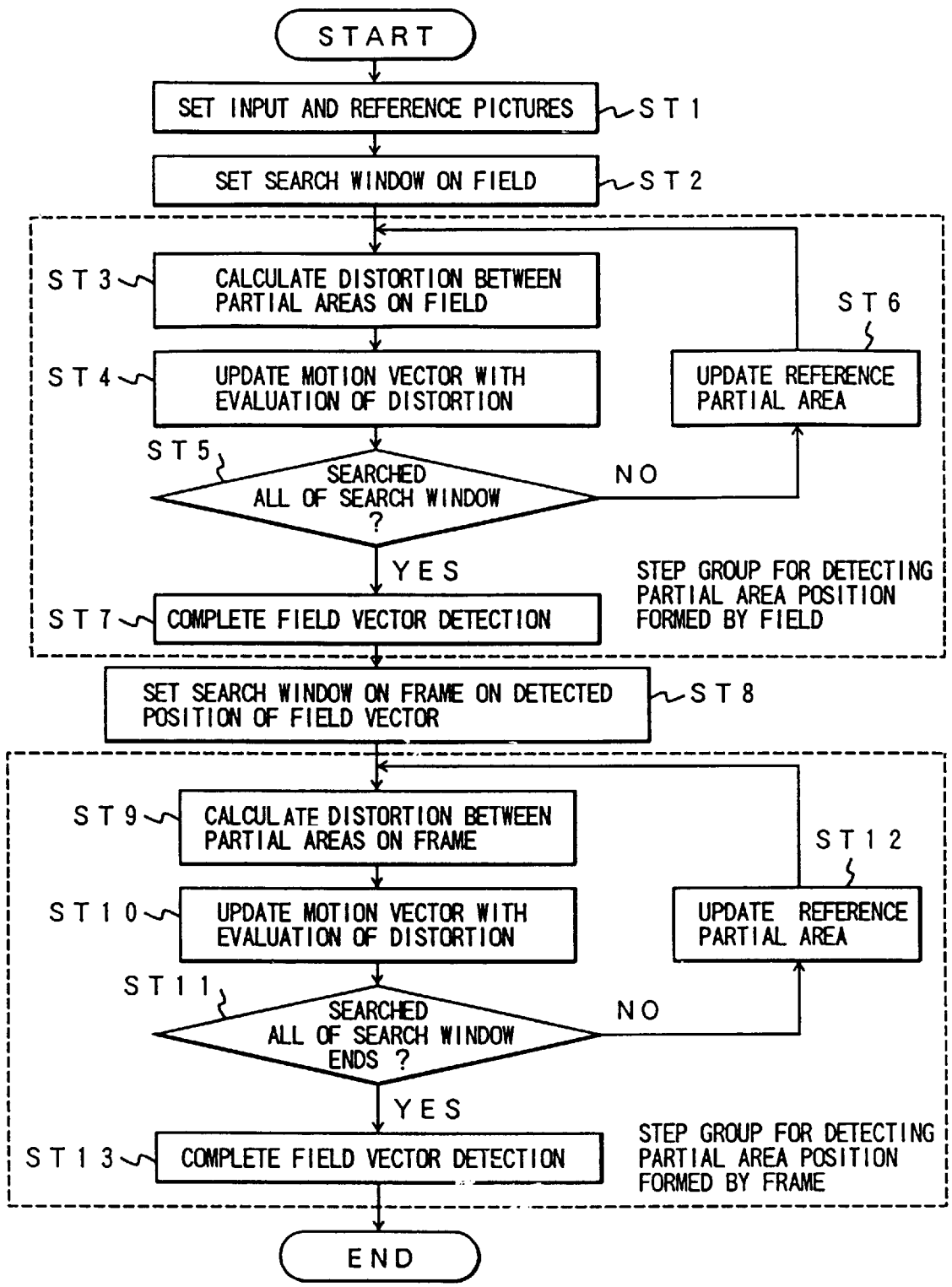
F I G. 1

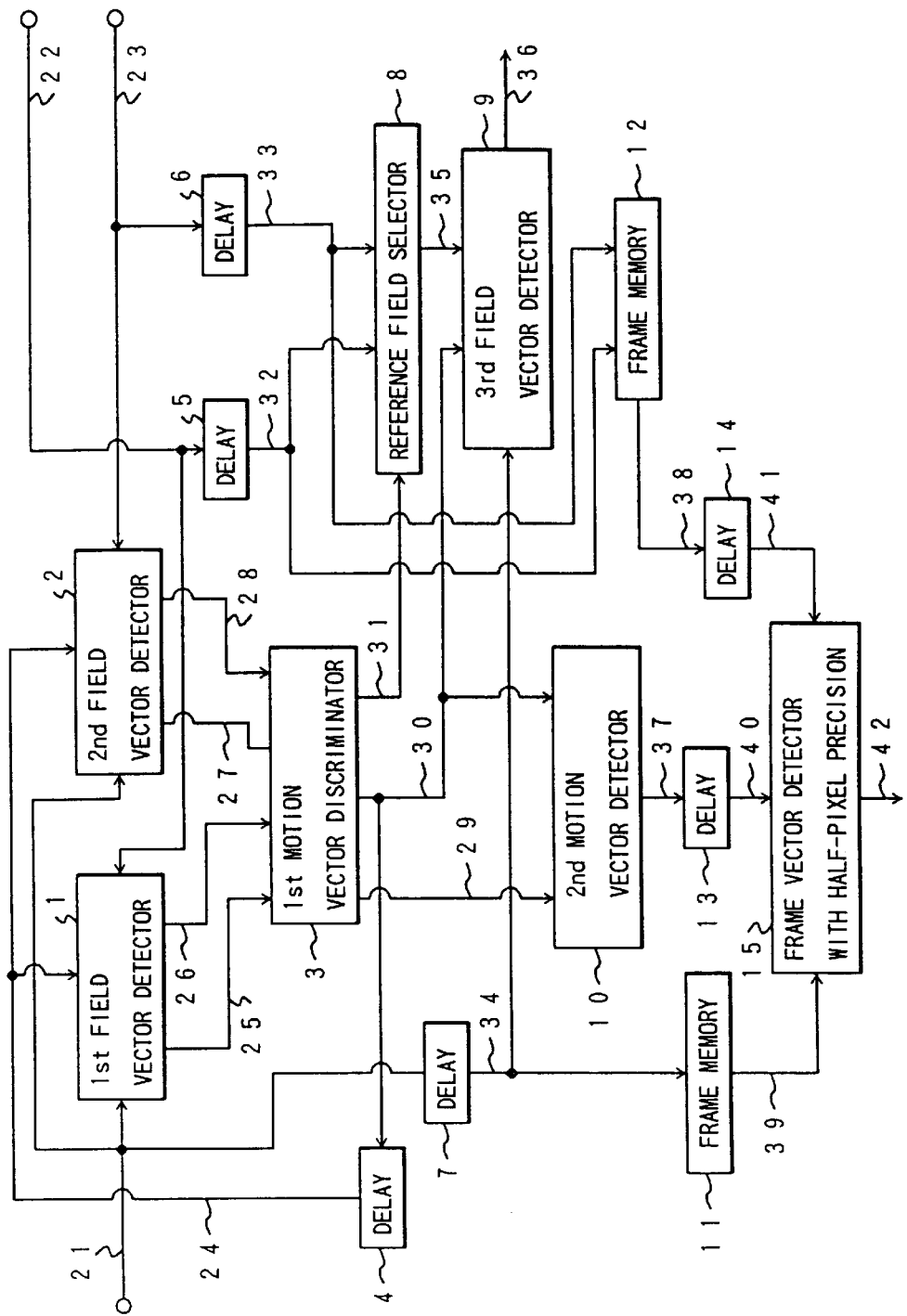
F I G. 13

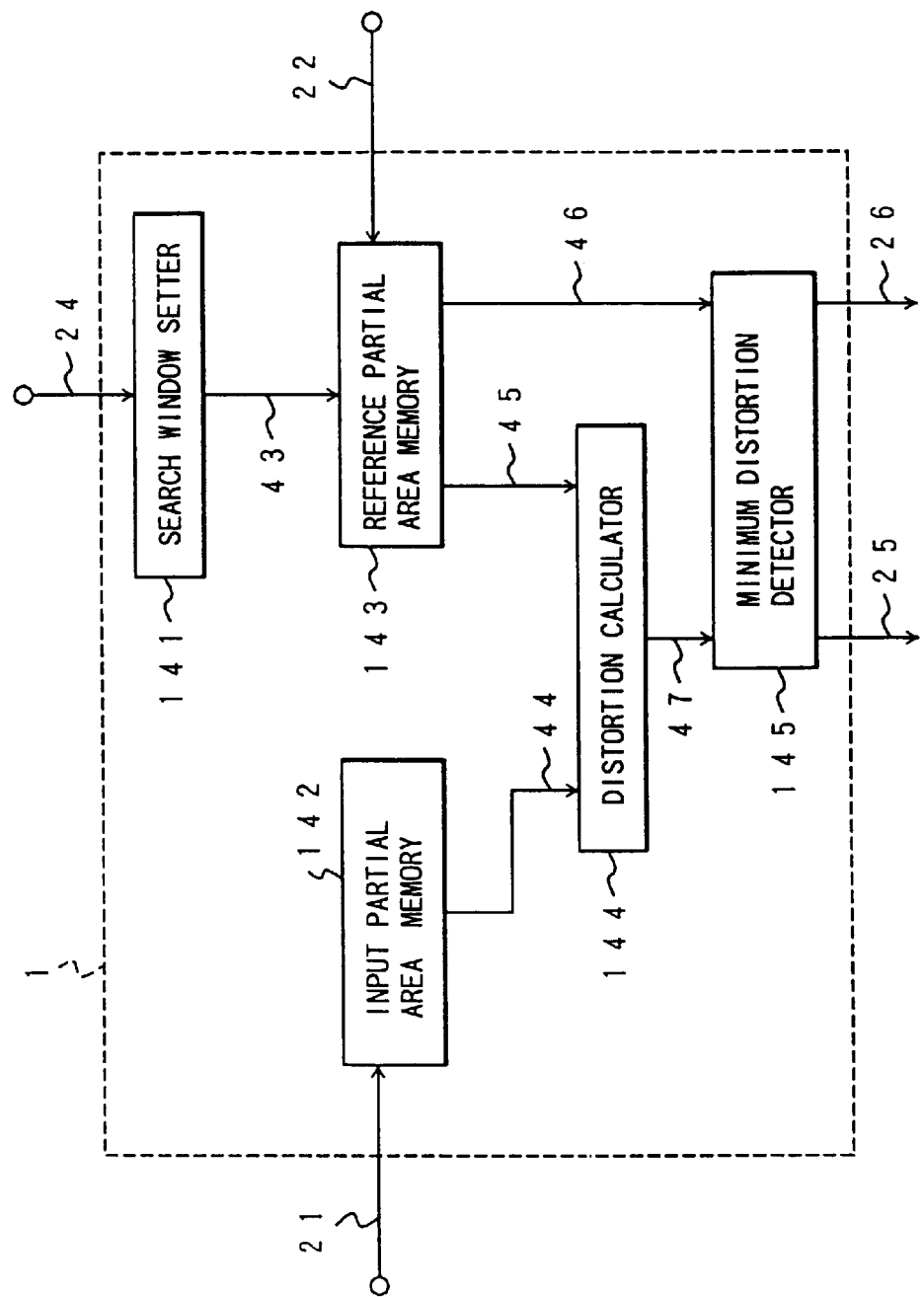
F I G. 14

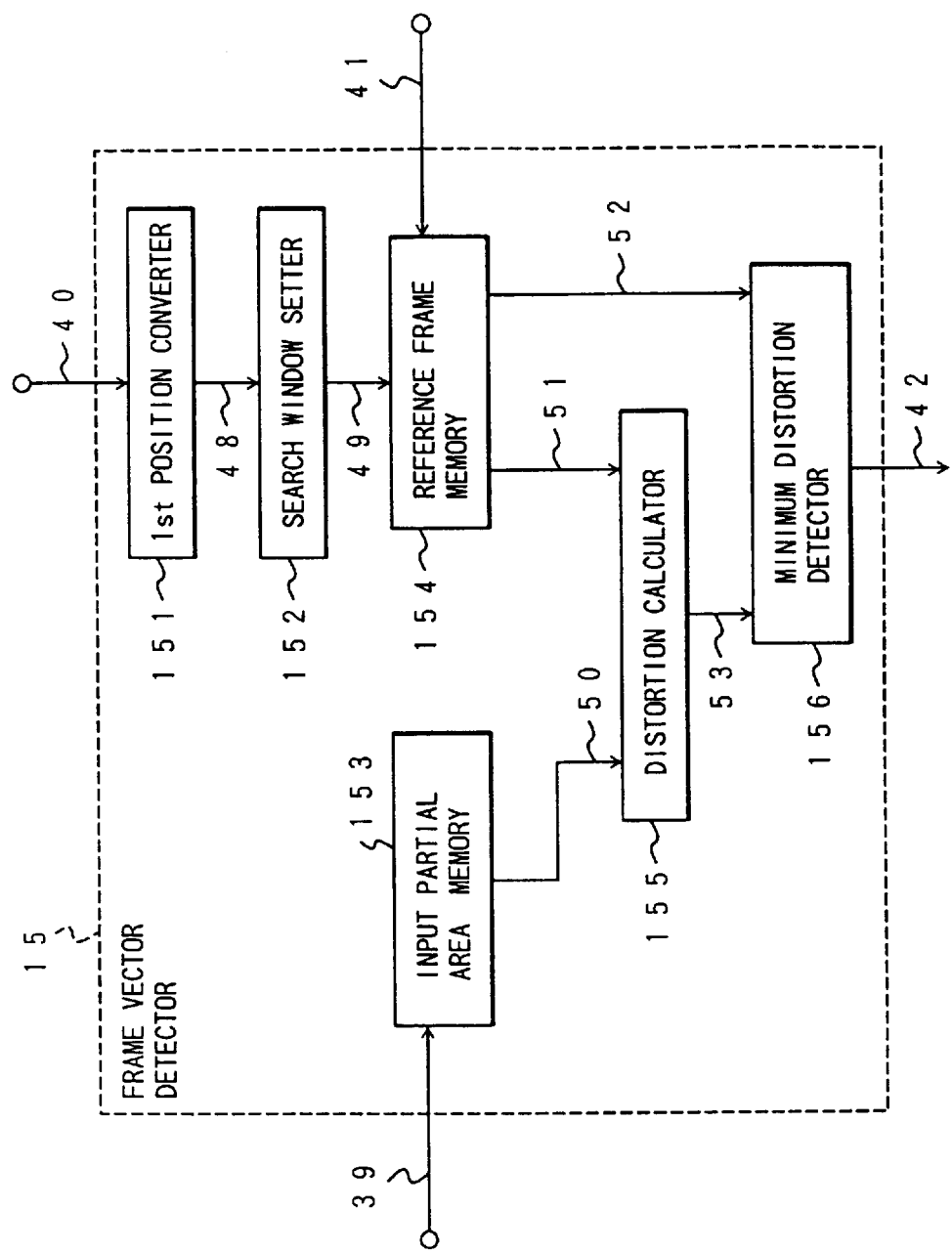
F I G. 1 5

MOTION VECTOR DETECTING METHOD AND SYSTEM FOR MOTION COMPENSATING PREDICTIVE CODER

BACKGROUND OF THE INVENTION

The present invention relates to a coder of moving picture signals used for recording, communications, transmissions, broadcasting, etc., and in particular to a motion vector detecting method and a motion vector detecting system for motion compensating predictive coders which can code differences between motion vector data (representative of an area from which motion vectors move on a coded picture) and areas indicated by the motion vector data.

In video signals of multi-gradation such as television (TV) or photograph, since the quantity of video data is huge, when the digital video signals are processed (e.g., transmitted, recorded, etc.) in an unencoded format, a transmission path of wide frequency band and a recording medium of large capacity are inevitably required. Therefore in a video signal processing apparatus handling TV (visual) telephone, TV (visual) conference, cable television service (CATV), picture filing apparatus, etc., a coding technique for compressing the huge video signals down to a small quantity of data is required. As one of the moving picture coding methods, steps are performed as follows: a highest correlation area relative to a partial area of an input picture is detected on a coded reference picture; motion vector data indicative of from which area the partial area of the input picture moved on the coded reference picture is determined; and a difference between the partial area of the input picture and the detected partial area indicated by the motion vector data is coded.

On the other hand, as a scanning method for pictures, there exist methods of non-interlaced scanning (scanned one by one in sequence) and interlaced scanning (scanned every other line or alternately). An imperfect picture obtained by interlaced scanning (ore line is omitted between scanning lines) is referred to as a field, and a perfect picture obtained by one non-interlaced scanning or two interlace scannings is referred to as a frame.

In the case where no motion exists between two fields of the same frame, as with the case of the interlaced scanning picture, it is often effective to adopt the motion compensating predictive method using motion vector data detected on the basis of frame construction.

In contrast with this, in the case of the interlaced scanning picture, since some motion exists between the two fields in the same frame, it is often effective to adopt the motion compensating predictive method using motion vector data detected on the basis of the field construction.

Therefore, in the conventional method, in order to cope with both the cases where motion exists between two fields of the same frame and where no motion exists, the motion vector has been so far detected separately for both the partial area formed by the input picture frame and the partial area formed by a field separated according to the field phase. Further, the predictive distortion (obtained when one motion vector detected for the partial area formed by the frame is used) is compared with the addition of the predictive distortions (obtained when two motion vectors detected for two partial areas of two fields for constituting the same frame are used), and the motion vector is compensated for so that these distortions can be minimized in the conventional predictive coding method.

In the conventional motion vector detecting method, however, motion vector detection at a partial area of the frame of the input picture and the motion vector detection at a partial area of the field are executed separately. In other words, in order to obtain the motion vector for a partial area of the input picture, the calculation for detecting one frame motion vector and the calculation for detecting two field motion vectors are executed independently at a wide search window. There is thus a problem in that a huge quantity of calculations is required.

SUMMARY OF THE INVENTION

With these problems in mind, therefore, it is the object of the present invention to provide a motion vector detecting method and system, which can markedly reduce the total retrieval calculations required to detect motion vectors, without degrading the detection precision of the motion vectors, in spite of the fact that the search window of the motion vectors is fairly narrow. In this method, the motion vector is detected with respect to a partial area formed by an input picture field; and the position on the reference picture indicated by the detected field vector is determined as the basic point of the frame vector search window.

To achieve the above-mentioned object, the present invention provides a method of detecting motion vector data representative of motion of a partial area in an input picture from any area on a reference picture, comprising: a first step of determining a first distortion between a partial area constructed by fields of the input picture and a partial area constructed by fields of the reference picture as a first evaluation value, and detecting a position of the partial area constructed by the fields of the reference picture at which the first evaluation value becomes the minimum value; a second step of setting a search window on a frame of the reference picture on the basis of a detected position of the partial area constructed by the fields of the reference picture previously detected; and a third step of determining a second distortion between a partial area constructed by a frame in the set search window and a partial area constructed by a frame of the input picture as a second evaluation value, and detecting a position of the partial area constructed by the frame of the reference picture at which the second evaluation value becomes the minimum value.

Further, the present invention provides a system for detecting motion vector data representative of motion of a partial area in an input picture from any area on a reference picture, comprising: means for calculating a first distortion between a partial area constructed by fields of the input picture and a partial area constructed by fields of the reference picture an a first evaluation value; means for detecting a position of the partial area constructed by the fields of the reference picture at which the first evaluation value becomes the minimum value; means for setting a search window on a frame of the reference picture on the basis of a detected position of the partial area constructed by the fields of the reference picture previously detected; means for calculating a second distortion between a partial area constructed by a frame in the set search window and a partial area constructed by a frame of the input picture as a second evaluation value; and means for detecting a position of the partial area constructed by the frame of the reference picture at which the second evaluation value becomes the minimum value.

Further, the present invention provides a method of detecting motion vector data indicative of from which area on a reference picture a partial area on an input picture moves, comprising the steps of: obtaining a first distortion between a partial area formed by an input picture field and a partial area formed by reference picture field, as a first evaluation rate, a plurality of the first distortions being obtained by shifting the partial area in a search window for each field; detecting a position of a partial area formed by a reference picture field, at which the obtained first evaluation rates are minimized, to detect a motion vector for each field; setting a search window on a reference picture frame on the basis of the detected position of the partial area formed by the reference picture field; obtaining a second distortion between a partial area formed by a frame within the set search window and a partial area formed by a frame of the input picture, as a second evaluation rate, a plurality of the second distortions being obtained by shifting the partial area in the set search window for each frame; and detecting a position of a partial area formed by a reference picture frame, at which the obtained second evaluation rates are minimized, to detect an motion vector for each frame.

Further, the present invention provides a system for detecting motion vector data indicative of from which area on a reference picture a partial area on an input picture moves, which comprises: means for calculating a first distortion between a partial area formed by an input picture field and a partial area formed by a reference picture field, as a first evaluation rate, a plurality of the first distortions being calculated by shifting the partial area in a search window for each field; means for detecting a position of a partial area formed by a reference picture field, at which the calculated first evaluation rates are minimized, to detect a notion vector for each field; means for setting a search window on a reference picture frame on the basis of the detected position of the partial area formed by the reference picture field; means for calculating a second distortion between a partial area formed by a frame within the set search window and a partial area formed by a frame of the input picture, as a second evaluation rate, a plurality of the second distortions being calculated by shifting the partial area in the set search window for each frame; and means for detecting a position of a partial area formed by a reference picture frame, at which the calculated second evaluation rates are minimized, to detect a motion vector for each frame.

In the motion vector detecting method according to the present invention, in the first step, a correlation degree between the partial area constructed by the fields of the input picture and the partial area constructed by the fields of the reference picture is calculated be calculating the distortion between the partial area constructed by the fields of the input picture and the partial area constructed by the fields of the reference picture. Further, a position of the partial area constructed by the fields of the reference picture at which the calculated first distortion becomes the minimum value is determined to detect a motion vector for each field. Further, in the second step, a narrow search window for detecting the frame vector on the frame of the reference picture is determined on the basis of the position indicated by the detected field vector on the reference picture detected by the first step. Further, in the third step, a correlation degree between the partial area constructed by the frame of the input picture and the partial area constructed by the frame of the reference picture frame is calculated, by calculating a second distortion between the partial area within the search window constructed by the frame of the referential picture set in the second step and the partial area formed by the frame of the input picture. Further, a position of the partial area formed by the frame of the reference picture at which the calculated second distortion becomes the minimum value is determined to detect a motion vector for each frame.

Further, in the motion vector detecting system according to the present invention, in the first means, a correlation degree between the partial area constructed by the fields of the input picture and the partial area constructed by the fields of the reference picture is calculated by calculating the distortion between the partial area constructed by the fields of the input picture and the partial area constructed by the fields of the reference picture. Further, in the second means, a field vector is detected by detecting a position of the partial area constructed by the fields of the reference picture at which the calculated first distortion becomes the minimum value. Further, on the basis of the position of the reference picture indicated by the field vector detected by the second means, a search window for detecting the frame vector on the frame of the reference picture is determined narrow. Further, in the fourth means, a correlation degree between the partial area constructed the frame of the input picture and the partial area constructed by the frame of the reference picture frame is calculated, by calculating a second distortion between the partial area within the search window constructed by the frame of the referential picture set in the second step and the partial area formed by the frame of the input picture. Further, in the fifth means, a position of the partial area constructed by the frame of the reference picture at which the calculated second distortion becomes the minimum value is determined to detect a motion vector for each frame.

Here, the frame vector is used for motion compensation, when the distortion between the partial area of the reference picture frame and the partial area of the input picture frame is calculated without separating the partial area of the input picture by phase and farther the calculated distortion is small relative to the other motion compensation. In other words, this corresponds to the case where the direction and the magnitude of the motion vector are both roughly equal to each other in both the field lines of the partial area of the input picture frame. Further, when the field vector is detected, the partial area of the input picture is detected by detecting the partial area of the reference picture field having a small distortion relative to the respective partial areas separated by the field phase. In other words, in the case where the frame vector is selected for motion compensation, as far as the picture motion can be detected firmly on the basis of the field vector detection, it is natural that the position indicated by the field vector roughly matches the position indicated by the frame vector on the picture. Therefore, when the detection result of the field vector is used to determine the basic retrieval position, even if the search window or the frame vector is limited narrow, it is possible to reduce the amount of calculations required to detect the frame vector, without raising any problem with respect to frame vector detection.

As described above, in the present invention, since the motion vector is detected for the partial area formed by the input picture field and since the position indicated by the obtained field vector on the reference picture is determined as a basic retrieval point, the frame vector search window is narrowed, and it is possible to markedly reduce the total quantity of the retrieval and calculation required to detect the motion vectors, without degrading the detection precision of the frame vectors.

BRIEF DESCRIPTION OF THE DRAWINGS

In the attached drawings:

FIG. 1 is a flowchart showing the basic concept of the present invention;

FIG. 13 is a block diagram showing a motion vector detector of the third embodiment according to the present invention;

FIG. 14 is a detailed block diagram showing the first or second field vector detector shown in FIG. 13, FIG. 15 is a detailed block diagram showing the frame vector detector shown in FIG. 13;

DETAILED DESCRIPTION OF THE EMBODIMENTS

Figure 2:
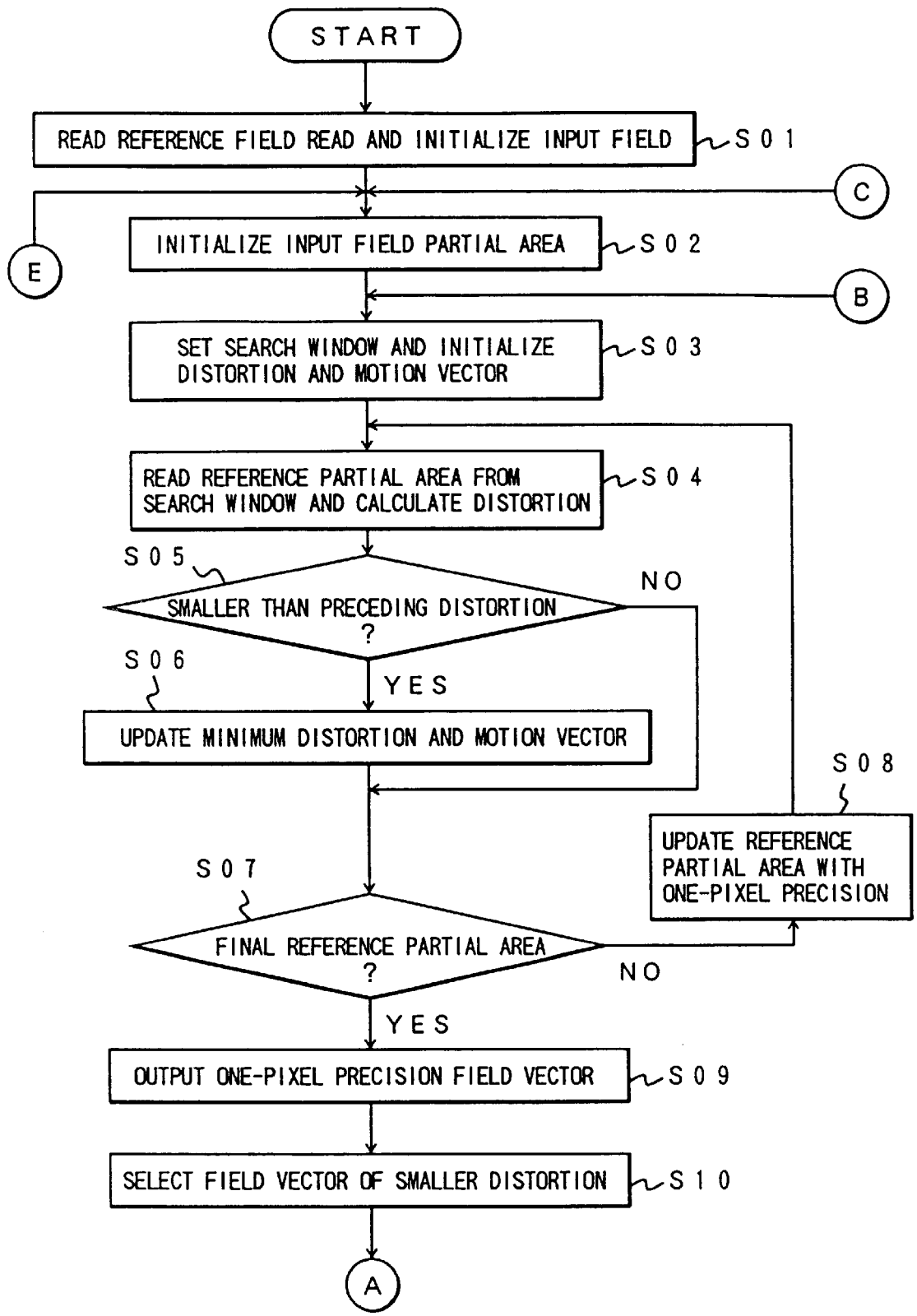
FIGS. 2 to 4 are flowcharts showing the procedure of the first embodiment according to the present invention.

With reference to the attached drawings, the motion vector detecting method and system according to the present invention will be explained hereinbelow on the basis of some preferred embodiments.

FIG. 1 is a flowchart showing the basic concept of the motion vector detecting method according to the present invention. The control procedure is executed by the control system provided with a controller (CPU) and other necessary memory units (ROM, RAM, etc.) in accordance with software as shown in the attached flowcharts. Therefore, in explaining the control procedure with reference to the attached flowcharts, the controller is referred to simply as control.

First, in first step ST1, control sets an input picture and a reference picture, respectively. In this case, two reference field pictures are set for each input frame picture. In succeeding step ST2, a search window is set on the two reference field picture, respectively.

In the following steps from ST3 to ST7 control detects a position of the reference partial area, at which the error between the input partial area and the reference partial area in each field car be minimized In other words, in step ST3, an distortion between the partial areas at each reference field is calculated. In step ST4, control uses the distortion between the partial areas as an evaluation rate. When the current distortion is equal to or smaller than the preceding distortion, control updates both the motion vector and the distortion to detect the motion vector for each field. In step ST5, control detects whether the retrieval ends at ace search window. If it does not end, in step ST6, control updates the reference partial area, and repeats the procedure from step ST3 to step ST5 above.

On the other hand, in step ST5, control discriminates whether the retrieval at the search window ends. If it ends, control proceeds to step ST7 to complete the field vector detection. Accordingly, in a series of a group from step ST3 to step ST7, control sets the distortion between the partial area formed by the input picture field and the partial area formed by the reference picture field to an evaluation rate, and detects the partial area position formed by the fields of the reference picture at which the evaluation rate can be minimized.

Successively, in step ST8, control sets the search window on the reference picture frame on the basis of the detection position of the partial area formed by the reference picture field and detected through the step groups from step ST3 to step ST7.

After that, in a step group including from step ST9 to step ST13, control detects the position of the reference partial area at which the error between the partial area of the input frame and the partial area of the reference frame can be minimized.

In other words, in step ST9, control calculates the distortion between the partial area formed by the frame in the above-mentioned search window and the partial area formed by the frame of the input picture. Further, in step ST10, control updates both the motion vector and the distortion according to the difference between the preceding distortion and the current distortion (evaluation rate). In step ST11, control checks whether the frame search ends in the search window. If it does not end, control updates the reference partial area again in step ST12, repeating the procedure from step ST9 to step ST11, again.

On the other hand, in step ST11, control discriminates whether the retrieval in the search window ends. If it ends, control proceeds to step ST13, to complete the frame vector detection. Therefore, a series of groups from ST9 to ST13 detects the position of the partial area formed by the frame of the reference picture, at which the distortion (the evaluation rate) between the partial area formed by the frame in the search window and the partial area formed by the frame of the input picture can be minimized.

The motion vector detecting method of the first embodiment according to the present invention will be described hereinbelow with reference to the flowchart shown in FIGS. 2 to 4.

Prior to the description of the flowcharts shown in FIGS. 2 to 4, the motion vector detecting method will be explained with reference to FIGS. 5A to 5C and FIGS. 6A to 6C. In FIG. 5A, a partial area 203 in an input field 103 is shown. In FIG. 5B, a partial area 204 in the input field 104 is shown. In FIG. 5C, a partial area 201 in the input frame is shown. Further, in FIG. 6A, a search window 301 in a reference field 105 is shown, and in FIG. 6B, a search window 302 in the reference field 106 is shown, In FIG. 6C, a partial area 202 in the reference frame is shown.

Figure 6A:
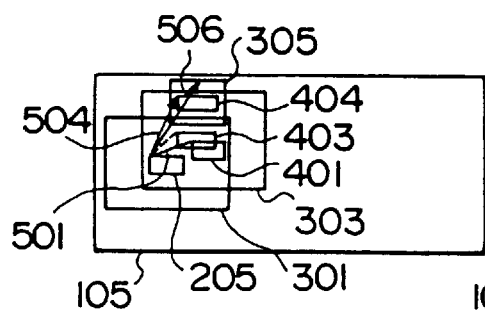
FIGS. 6A to 6C are reference pictures for assistance in explaining motion vector detection in the first embodiment according to the present invention.

The motion vector detection method from the reference fields 105 and 106 as shown in FIGS. 6A end 6B are explained hereinbelow.

In step S01 in FIG. 2, control reads the reference field 105 and the reference field 106 as the reference picture, and further reads the input field 103 as the coded picture. Further, in step S02, control reads the partial area 203 on the input field 103.

Figure 5A:
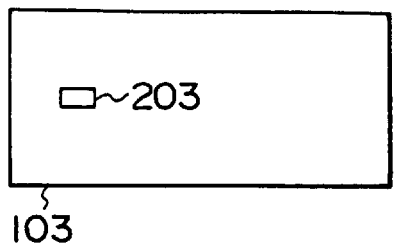
FIGS. 5A to 5C are input pictures for assistance in explaining motion vector detection in the first embodiment according to the present invention.
Figure 6B:
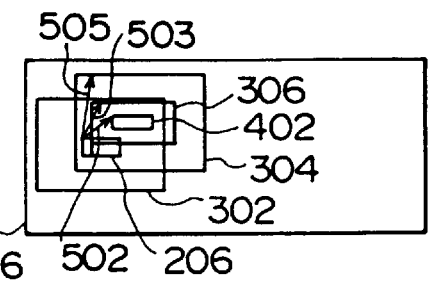

In step S03, control sets the motion vector search window 301 at a predetermined position on the reference field 105 (shown in FIG. 6A) and the motion vector search window 302 at a predetermined position on the reference field 106 (shown in FIG. 6B). Further, control stores temporarily the default motion vector candidate for the preceding input partial area 203 (shown in FIG. 5A) and the distortion for each reference field.

In step S04, control cats away the reference partial area from the retrieval ranges 301 and 302, respectively to calculate the distortion between the reference partial area and the input partial area, respectively.

In steps S05 and S06, control compares the distortion obtained in step S04 with the temporarily stored motion vector candidate distortion for each reference partial area 301 or 302. Here, if the distortion obtained in step S04 is equal to or less than the distortion of the temporarily stored distortion of the motion vector candidate, control updates the temporarily stored motion vector candidate and the distortion with the motion vector indicative of the position in the reference field of the reference partial area and the distortion corresponding thereto. Further, if the distortion obtained in step S04 is larger, control does not update both the temporarily stored motion vector candidate and the distortion, proceeding to step S07.

In step S07, control checks whether the reference partial area is the final reference partial area of the search window 301 or the 302. If it is not the final reference partial range, control returns to step S04 via step S04. If it is the final reference partial range, control proceeds to step S09.

In step S08, control updates the reference partial area of the search window 301 or 302 by shifting the position of the reference partial range in the search window pixel by pixel, respectively.

In step S09, control outputs two one-pixel precision field vectors detected at the search window 301 or 302 of the reference fields 105 and 106 with respect to the partial area 203 of the input field 103, through the processing from step S03 to step S08. For instance, the motion vector 501 on the reference field 105 as shown in FIG. 6A and the motion vector 502 on the reference field 106 as shown in FIG. 6B are outputted as the one-pixel precision field vectors from the reference field 105 and the reference field 106 for the partial area 203 on the input field 103 shown in FIG. 5A.

In step S10, control selects the motion vector having a smaller distortion between the reference partial area and the input partial area, as a one-pixel precision field vector, from the two motion vectors detected by the two reference fields as described above. For instance, in FIGS. 6A and 6B, if the distortion between the partial area on the input field 103 (shown in FIG. 5A) and the partial area 402 on the reference field 106 (shown in FIG. 6B) is smaller than the distortion between the partial area on the input field 103 (shown in FIG. 5A) and the partial area 401 on the reference field 105 (shown in FIG. 6A), the motion vector 502 is selected as the field vector of one-pixel precision.

Figure 3:
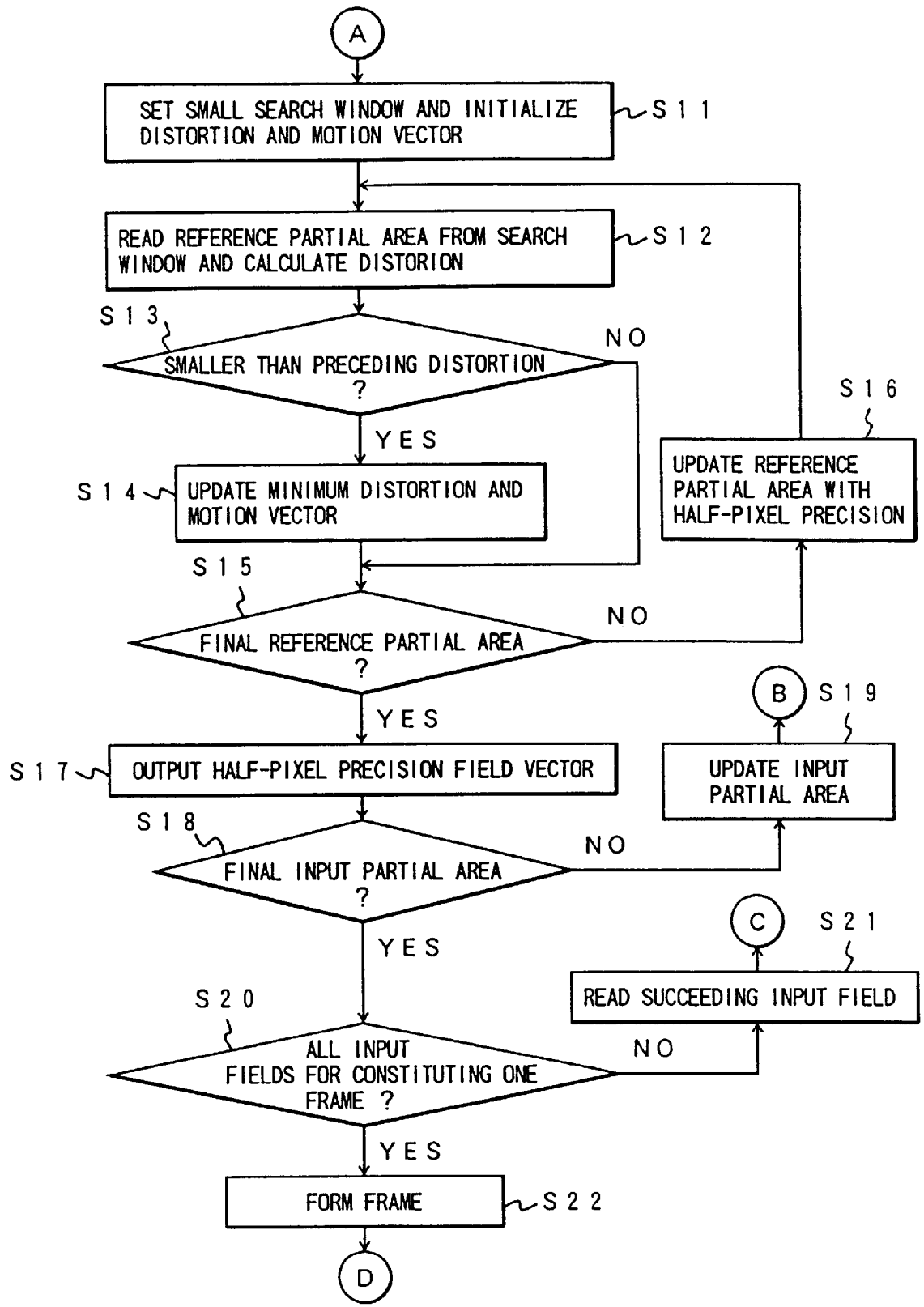

In FIG. 3, in step S11, in order to detect a half-pixel precision field vector, control sets a small search window 306 by determining the reference partial area 402 as its center. In addition, control stores temporarily the default motion vector candidate with respect to the preceding input partial area 203 and the distortion.

In step S12, control cuts off the reference partial area from the search window 306, and further calculates the distortion between the reference partial area and the input partial area 203.

In step S13 and step S14, control compares the distortion obtained in step S12 with the distortion of the motion vector candidate previously stared temporarily for each reference partial area. If the distortion obtained in step S12 is equal to or less than the distortion of the motion vector candidate temporarily stored, control updates the temporarily stored motion vector candidate and the distortion with the motion vector indicative of the position in the reference field of the reference partial area and its distortion. Further, if the distortion obtained in step 12 is larger than the distortion of the motion vector candidate temporarily stored, control does not update the temporarily stored motion vector candidate and the distortion, proceeding to step S15.

In step S15, control checks whether the reference partial area is the final reference partial area in the search window 306. If it is not the final reference partial area, control returns to step S12 via step S16. If it is the final reference partial area, control proceeds to step S17.

In step S16, control updates the reference partial area by shifting the position of the reference partial area in the search window 306 half pixel by half pixel.

In step S17, control outputs the half pixel precision field vector detected from the search window 306 for the partial area 203 of the input field 103 through the processing from step S11 to step S16. For instance, the motion vector 503 on the reference field 106 shown in FIG. 6B is outputted as the half pixel precision field vector from the reference field 106 shown in FIG. 6B with respect to the partial area 203 on the input field 103 shown in FIG. 5A.

In step S18, control checks whether the partial area 203 of the input field 103 at which the field vector is now being detected is the final input partial area of the input field. If it is not the final input partial area, control updates the partial area of the input field 103 in step S19, and returns to step S03 shown in FIG. 2. If it is the final input partial area of the input field, control proceeds to step S20.

In step S20, control checks whether the field vectors have all been detected for a predetermined number of the input fields constituting one frame. If all are not yet detected, control proceeds to step S21 to reads the succeeding input field, and returns to step S01 shown in FIG. 2. If the field vectors have been all detected for a predetermined number of the input field constituting one frame, control proceeds to step S22. For instance, after the field vector as been detected for the input field 103 shown in FIG. 5A, control reads the succeeding input field 104 shown in FIG. 5B in step S21, and further reads the partial area 204 on the input field 104. The field vector for the partial area 204 on the input field 104 is executed in the same procedure as when the field vector for the partial area 203 is detected on the input field 103.

In step S03, on both the pictures of the reference field 105 and the reference field 106, shown in FIGS. 6A and 6B, control sets motion vector retrieval ranges 303 and 304 on the reference fields 105 and 106, respectively, on the basis of the motion vector 502 indicative of the position of the partial area having a smaller distortion between the reference and input partial areas in the one-pixel precision field vector obtained for the partial area 203 on the preceding input field 103. At the same time, control stores temporarily the default motion vector candidate and the distortion with respect to the input partial area 204 in the respective search windows.

Further, through the procedure from step S04 to step S08, control detects one-pixel precision field vectors from the search window 203 and the search window 304, respectively. The obtained two one-pixel precision field vectors (e.g., the motion vector 504 on the reference field 105 and the motion vector 505 on the reference field 504) are outputted in step S09.

In step S10, control selects one motion vector having a smaller distortion relative to the partial area 204 on the input field 104 from the two one-pixel precision field vectors as the one-pixel precision field vector. For instance, in FIG. 6A, the motion vector 504 indicative of the partial area 404 on the reference field 105 is selected as the one-pixel precision field vector.

In step S11 shown in FIG. 3, in order to detect the half-pixel precision field vector, control sets a small motion vector search window 305 by setting the reference partial area 404 as its center, and further stores temporarily the default motion vector candidate and the distortion of the preceding input partial area 204.

Further, through the procedure from step S12 to S16, control detects the half-pixel precision field vector from the search window 305.

In step S17, control outputs the obtained half-pixel precision field vector 506.

In step S18, control checks whether the partial area 204 of the input field 104 whose field vector is now being detected is the final input partial area of the same input field. If it is not the final input partial area, in stop S19, control updates the partial area of the input field 104, returning to step S03. If it is the final input partial area of the input field, control proceeds to step S20.

In step S20, through the above-mentioned procedure from step S03 to step S19, control checks whether the field vector detection is complete for a predetermined number of input fields for constituting one frame (e.g., the input fields 103 and 104 shown in FIGS. 5A and 5B. If it is not complete, control proceeds to step S21 to read the succeeding input field (e.g., the input field 104 slogan in FIG. 5B), returning to step S02 to execute the field vector detection processing for the succeeding input field. If it is complete, control proceeds to step S22.

Figure 5B:
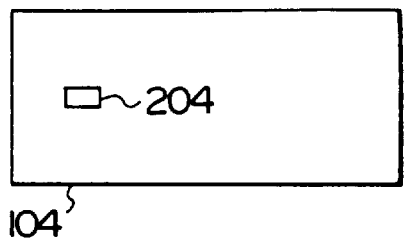
Figure 5C:
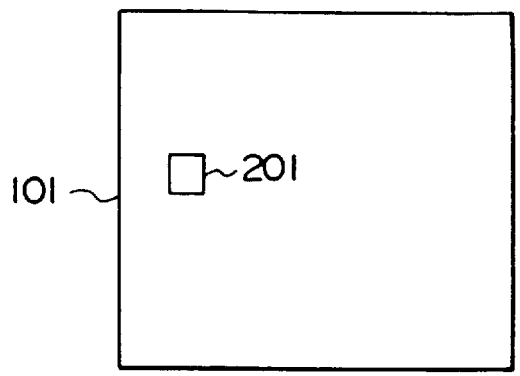
Figure 6C:
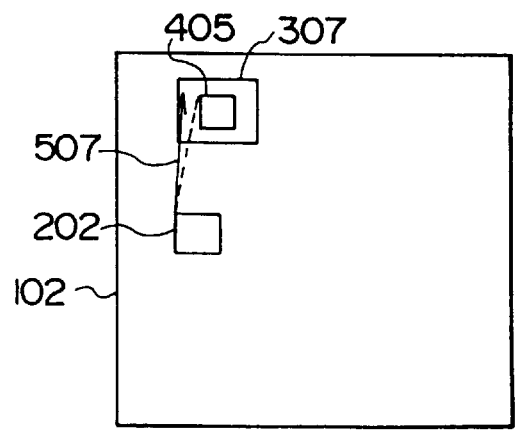

Here, the motion vector detecting method of the partial area 201 on the input frame 101 as shown in FIG. 5C on the basis of the reference frame 102 as shown in FIG. 6C will be described hereinbelow.

First, in step S22, control constructs one input frame and one reference frame on the basis of one set of input fields and one set of reference fields all read in the above-mentioned steps S02 and S21, respectively. For instance, the input frame 101 as shown in FIG. 5C can be constructed by the two input fields 103 and 104 as shown in FIGS. 5A and 5B, and the reference frame 102 as shown in FIG. 6A can be constructed by the two input fields 105 and 106 as shown in FIGS. 6A and 6B.

Figure 4:
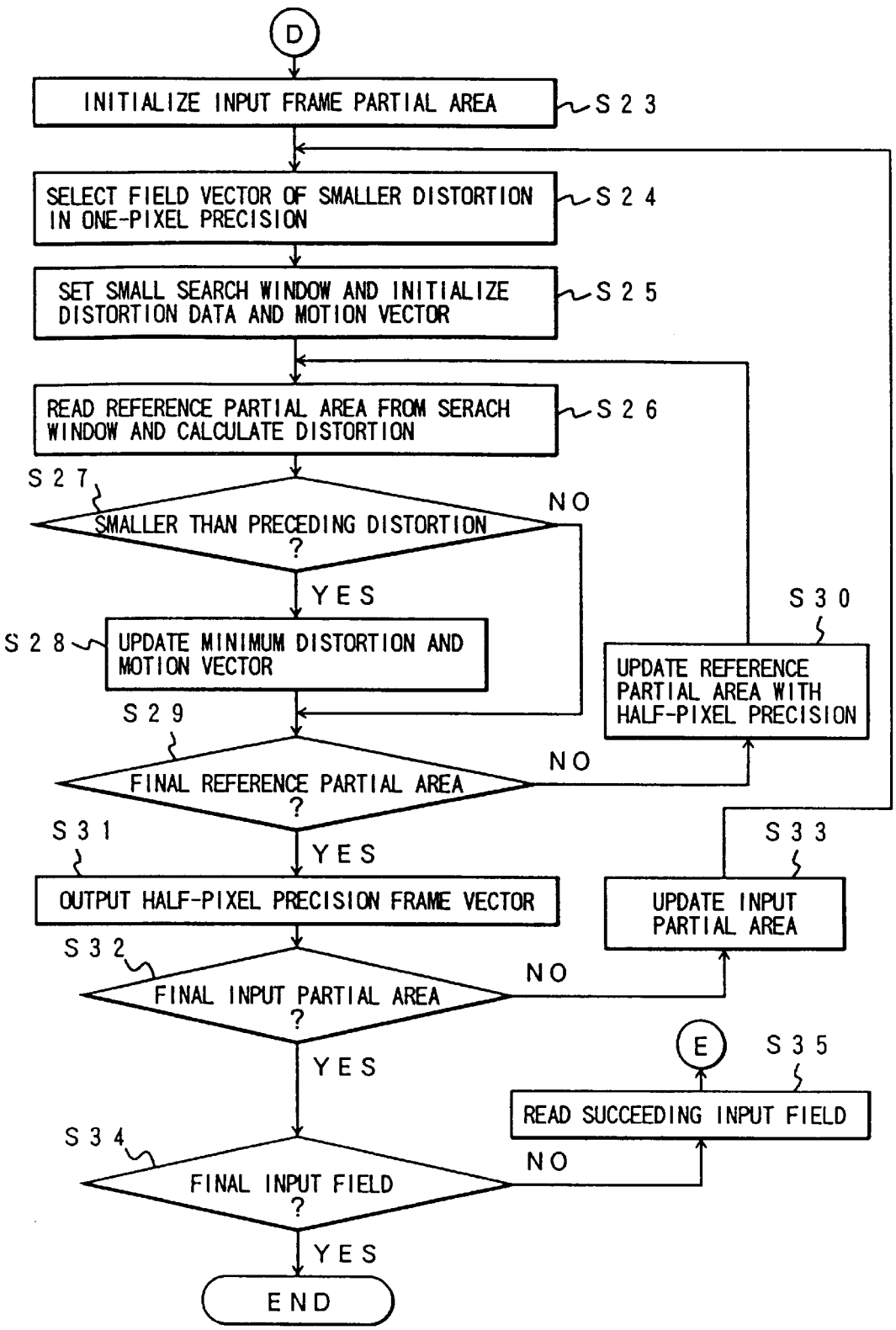

In step S23 shown in FIG. 4, control reads the partial area of the input frame. The partial area 201 on the frame 101 now read is constructed by two field portions located at roughly the same positions on the two field pictures. For instance, the partial area 201 on the input frame 101 as shown in FIG. 5C is constructed by the partial area 203 on the input field 103 and the partial area 204 on the input field 104.

In step S24, control selects a one-pixel precision field vector having a smaller distortion between the reference partial area and the input partial area, as the retrieval standard of the half-pixel precision frame vector, from the two one-pixel precision field vectors detected for the two partial areas of the two input fields constituting one partial area of the one input frame. For instance when the distortion between the input partial area and the partial area on the reference field 105 as shown in FIG. 6A is indicated by the one-pixel precision motion vector 504 detected for the partial area 204 on the input field 104 as shown in FIG. 5B is smaller than the distortion between the input partial area and the partial area on the reference field 106 as shown in FIG. 6B indicated by the one-pixel precision motion vector 502 detected for the partial area 203 on the input field 103 as shown in FIG. 5A, the motion vector 504 s selected as the search basis of the half-pixel precision frame vector.

In step S25, in order to detect the half-pixel precision frame vector, control converts the position on the reference field 105 indicated by the motion vector 504 into the position on the reference frame 102, and sets a small motion vector search window 307 for determining the reference partial area 405 on the reference frame (existing on this position) as its center. In addition, control stores temporarily the motion vector candidate and the distortion at the input partial area 201.

In step S26, control cuts off the reference partial area from the search window 307 and calculates a distortion between the reference partial area and the input partial area 201.

In steps S27 and S28, control compares the distortion obtained in step S26 with the motion vector candidate previously stored temporarily for each reference partial area. If the distortion obtained in step S26 is equal to or less than the distortion of the temporarily stored motion vector candidate, control updates the temporarily stored motion vector candidate and the distortion with the motion vector indicative of the position of the reference partial area in the reference frame and the distortion. If the distortion obtained in step S26 is larger than the temporarily stored motion vector candidate and the distortion, control proceeds to step S29 without updating the temporarily stored motion vector candidate and the distortion.

In step S29, control checks whether the reference partial area is the final reference partial area of the search window 307. If it is not the final reference partial area, control returns to step S26 via step S30. If it is the final reference partial area, control proceeds to step S31.

In the above-mentioned step S30, control updates the reference partial area in the search window 307 by shifting the reference partial area in the search window half pixel by half pixel In step S31, control outputs the half-pixel precision frame vector (e.g., the motion vector 507 on the reference frame 102 as shown in FIG. 6C) detected from the search window 307 with respect to the partial area 201 of the input frame 101 as shown in FIG. 5C through the above-mentioned procedure from step S25 to step S30.

In step S32, control checks whether the partial area 201 of the input frame 101 whose frame vector is now being detected is the final input partial area of the same input frame. If it is not the final input partial area, in step S33, control updates the partial area of the input frame 101, returning to step S24. If it is the final input partial area of the input frame, control proceeds to step S34.

In step S34, control checks whether the motion vectors have been detected for a predetermined number of input fields. If the motion vectors of a predetermined number of input fields have not yet been detected, control resets the previous input fields in step S35 and reads the succeeding input field, returning to step S02 shown in FIG. 2. If the motion vectors of a predetermined number of input fields have been detected, control ends the motion vector detection processing for the same reference picture.

Figure 11A:
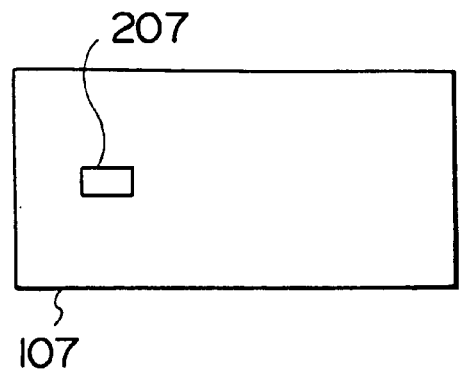
FIGS. 11A to 11E are input pictures for assistance in explaining motion vector defection in the second embodiment according to the present invention.
Figure 11B:
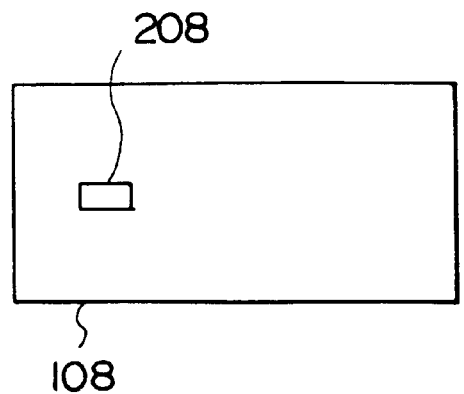
Figure 11C:
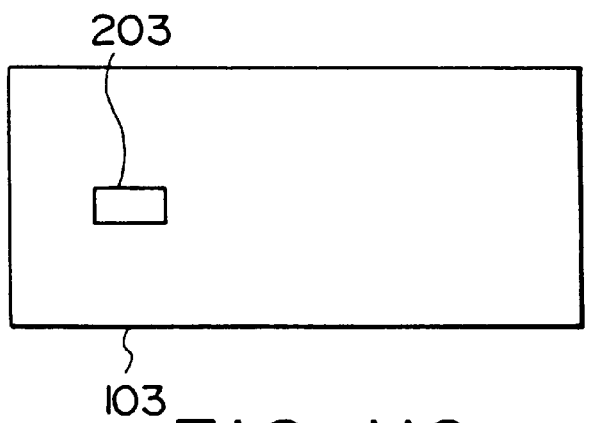
Figure 11D:
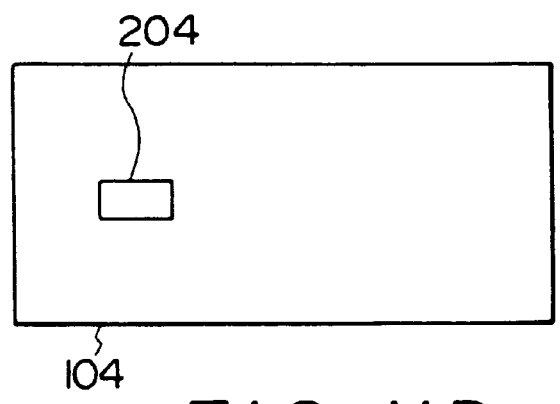
Figure 12A:
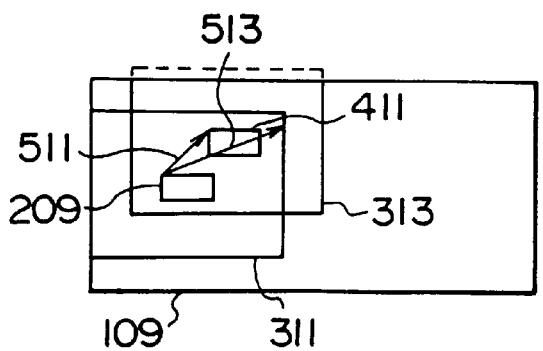
FIGS. 12A to 12E are reference pictures for assistance in explaining motion vector detection in the second embodiment according to the present invention.
Figure 12B:
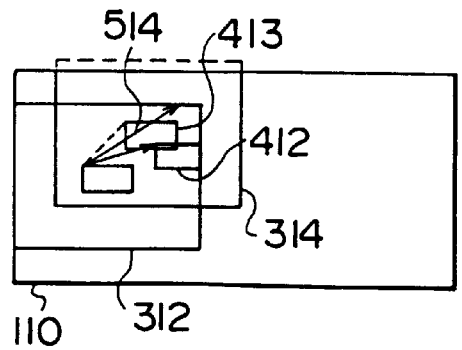
Figure 12C:
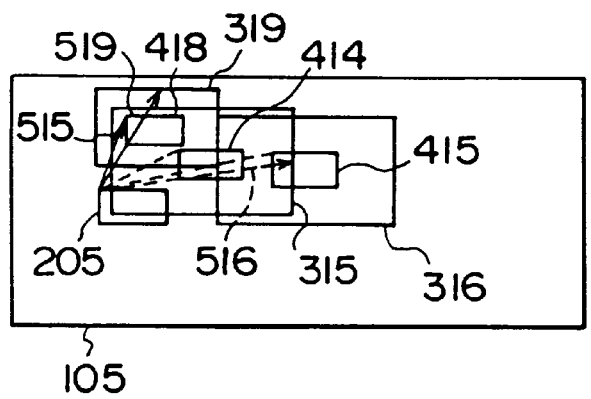
Figure 12D:
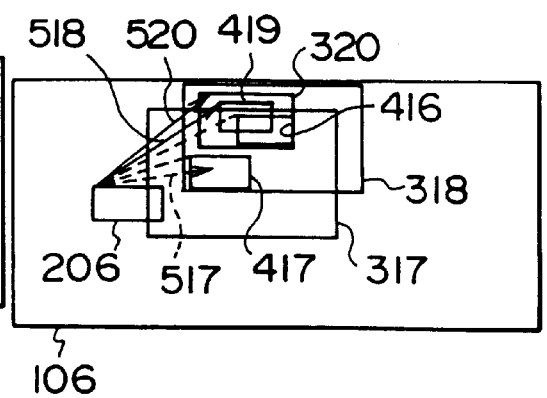

A second embodiment of the motion vector detecting method according to the present invention will be described hereinbelow with reference to the flowcharts shown in FIGS. 7 to 10. In this second embodiment, the reduced partial areas 207 and 208 on the reduced input fields 107 and 108 as shown in FIGS. 11A and 11B can be obtained by sampling the input fields 103 and 104 as shown in FIGS. 11C and 11D, respectively. Further, the reduced reference fields 109 and 110 as shown in FIGS. 12A and 12B can be obtained by sampling the reference fields 105 and 106 as shown in FIGS. 12C and 12D, respectively. In this embodiment, the motion vectors are detected from the reduced reference fields 109 and 110 with respect to the reduced partial areas 207 and 208 on the reduced input fields 107 and 108, respectively.

Figure 7:
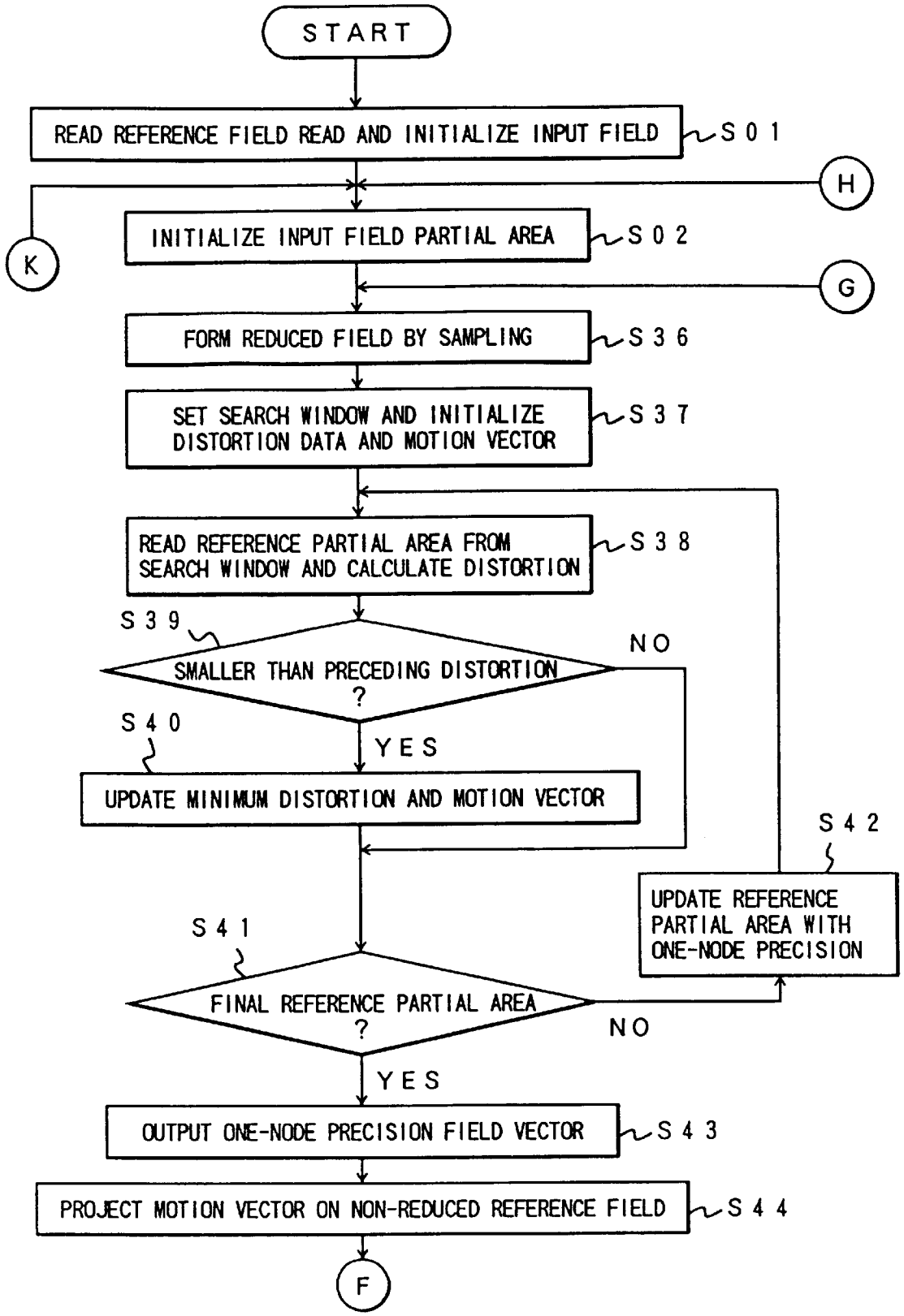
FIGS. 7 to 10 are flowcharts showing the procedure of the second embodiment according to the present invention.

In step S01 shown in FIG. 7, control reads two reference fields 105 and 106 as shown in FIGS. 12C and 12D as the reference pictures, and further reads an input field 103 (as shown in FIG. 11C) to be coded. Further, control samples the read reference fields 105 and 106 to form reduced reference fields 109 and 110 as shown in FIGS. 12A and 12B. Further, in step S02, control reads the partial area 203 on the input field 103.

In step S36, control forms the reduced input fields. In the example as shown in FIGS. 11A to 11E, the reduced input field 107 is formed by sampling the input field 103 as shown in FIG. 11C. In this case, the input partial area 203 on the input field 103 corresponds to the reduced input partial area 207 on the reduced input field 107.

In step S37, control sets the motion vector search windows 311 and 312 on the pictures of the reduced reference fields 109 and 110, as shown in FIGS. 12A and 12B, respectively, and further temporarily stores the default motion vector candidate and the distortion of the preceding reduced input portion areas 207 for each reduced reference field.

In step S36, control cuts off the reduced reference partial areas from the search windows 311 and 312, respectively to calculate the distortion between the reduced reference partial area and the reduced input partial area 207, respectively.

In steps S39 and S40, control compare its the distortion obtained in step S38 with the distortion of the previously and temporarily stored motion vector candidate for each reduced reference partial area of both the search windows 311 and 312. If the distortion obtained in step S38 is equal to or less then the distortion of the temporarily stored notion vector candidate, the temporarily stored motion vector candidate and the distortion are updated with the motion vector indicative of the position at the reduced reference partial area in the reduced reference field, and the distortion. If the distortion obtained in step S38 is more than the distortion of the temporarily stored motion vector candidate, control proceeds to step S41, without updating the temporarily stored motion vector candidate and the distortion.

In step S41, control checks whether the reduced reference partial area is the final reference partial area of each of the search windows 311 and 312. If it is not the final reduced reference partial area, control returns to step S38 via step S42. If it is the final reduced reference partial area, control proceeds to step S43.

In the above-mentioned step S42, control updates the reduced reference partial area of each of the search windows 311 and 312 by shifting the position of the reduced reference partial area of each of the search windows 311 and 312 for each node (one pixel by one pixel).

In step S43, through the processing from the above-mentioned steps S37 to S42, control outputs the two one-node precision field vectors detected from the search windows 311 and 312 with respect to the reduced partial area 207 of the reduced input field 107. For instance, the motion vectors 511 on the reduced reference field 109 as shown in FIG. 12A and the motion vectors 514 on the reduced reference field 110 as shown in FIG. 12B are outputted as the one-node precision field vectors from the reduced reference fields 109 and 110, respectively with respect to the reduced partial area 207 on the reduced input field 107 as shown in FIG. 11A.

The method of detecting the motion vectors for the partial area 203 on the input field 103 and the partial area 204 on the input field 104 as shown in FIGS. 11C and 11D on the basis of the reference fields 105 and 106 as shown in FIGS. 12C and 12D, respectively will be described hereinbelow.

In step S44, control projects the one-node precision motion vectors 511 and 512 outputted in step S43 upon the non-reduced reference fields 105 end 106 as shown in FIGS. 12C and 12D, respectively.

Figure 8:
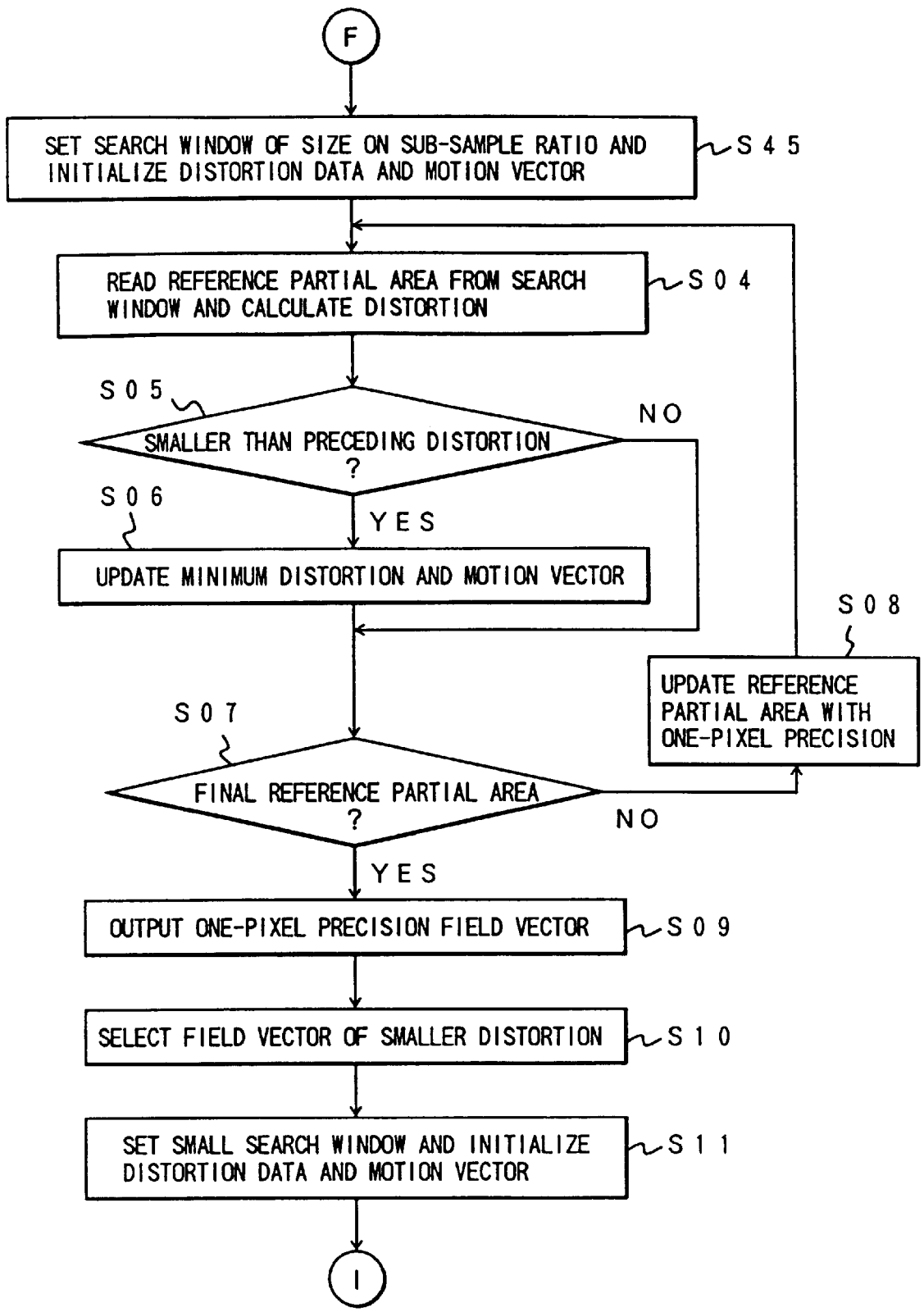

In step S45 shown in FIG. 8, control sets two search windows 315 and 317 (each of whose sizes corresponds to a sampling ratio) by determining the partial areas 414 and 417 existing at a position on the reference fields 105 and 106 and further indicated by the projected motion vectors 511 and 512 as their centers, respectively. Further, control stores temporarily the default motion vector candidate and the distortion for the input partial area 203 corresponding to the preceding reduced input partial area 207.

In step S04, control cuts off the reference partial area from the search windows 315 and 317, respectively, to calculate the distortion between the reference partial area and the input partial area 203, respectively.

In steps S05 and S06, control compares the distortion obtained in step S04 with the distortion of the temporarily stored motion vector candidate, for each of the two search windows 315 and 317. If the distortion obtained in step S04 is equal to or less than the distortion of the temporarily stored motion vector candidate, control updates the temporarily stored motion vector candidate and the distortion with the motion vector indicative of the position of the reference partial area on the reference field and the distortion. If the distortion obtained in step S04 is larger than the distortion of the temporarily stored motion vector candidate, control proceeds to step S07, without updating the temporarily stored motion vector candidate and the distortion, proceeding to step S07.

In step S07, control checks whether each of the reference partial areas are the final reference partial areas. If they are not the final reference partial areas, control returns to step S04 via the step S08. If they are the final reference partial areas, control proceeds to step S09.

In step S08, control updates the reference partial areas of each of the search windows 315 and 317 by shifting the position of the reference partial area in the search window pixel by pixel, respectively.

In step S09, control outputs two one-pixel precision field vectors detected at search window 315 or 317 with respect to the partial area 203 of the input field 103 through the processing from step S45 to step S08. For instance, the motion vectors 515 and 517 or the reference fields 105 and 106 as shown in FIGS. 12C and 12D are outputted as the one-pixel precision field vectors from the reference fields 105 and 106 for the partial area 203 on the input field 103 as shown in FIG. 11C.

In step S10, control selects the motion vector (whose distortion between the reference partial area and the input partial area is smaller) from the two motion vectors detected from the two reference fields as described above, as the one-pixel precision field vector. For instance, in FIG. 12C, the motion vector 515 on the reference field 105 is selected as the one-pixel precision field vector.

In step S11, in order to detect the half-pixel precision field vector, control sets a small search window 319 by setting the reference partial area 418 (existing on the reference field 105 indicated by the one-pixel precision field vector 515) as its center. Further, control temporarily stores the default motion vector candidate and the distortion of the preceding input partial area 208.

Figure 9:
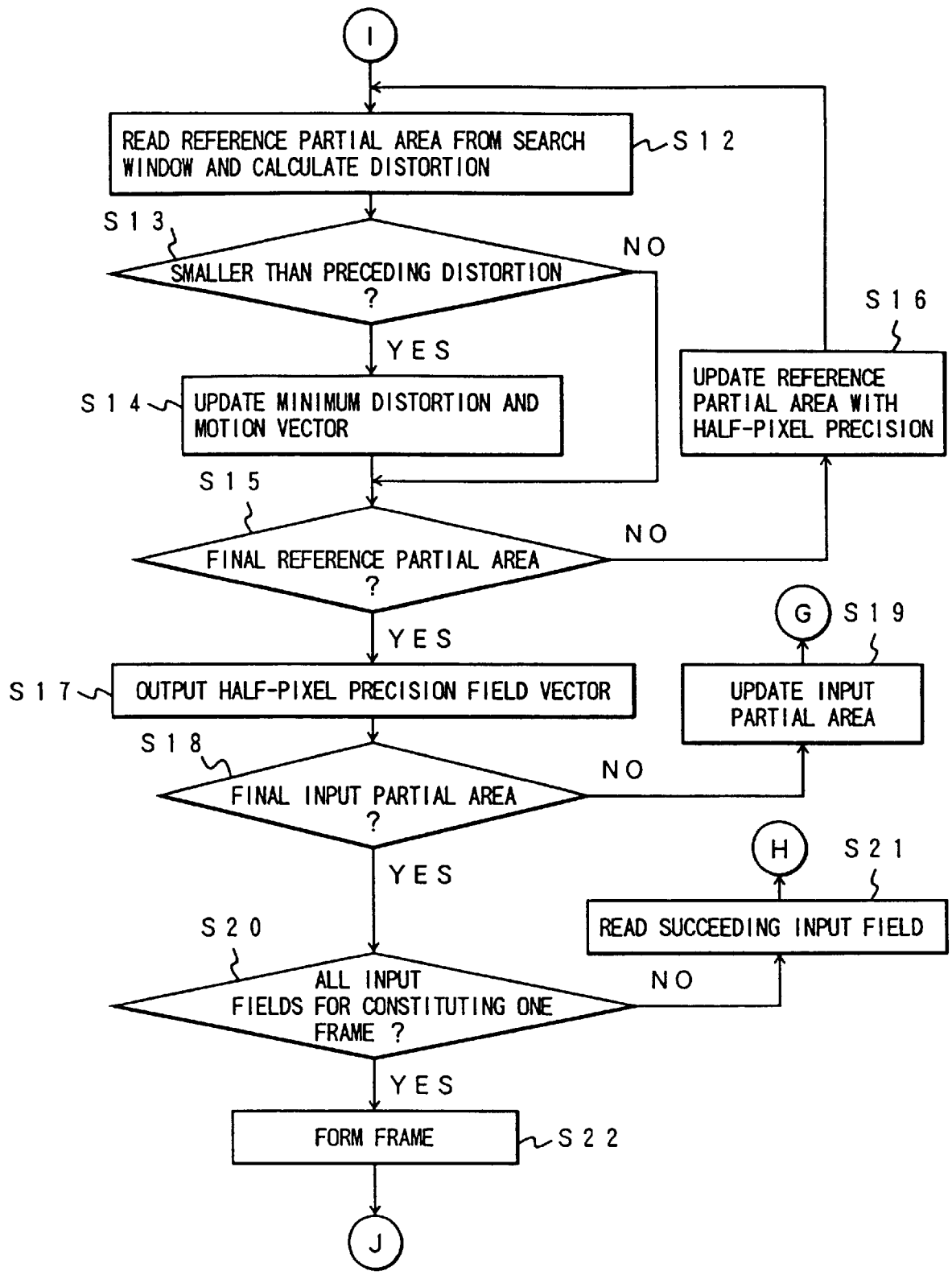

In step S12 shown in FIG. 9, control cuts away the reference partial area from the search window 319 to calculate the distortion between the reference partial area and the input partial area 203.

In steps S13 and 14, control compares the distortion obtained in step S12 with the distortion of the temporarily stored motion vector for each reference partial area. If the distortion obtained in step S12 is equal to or less than the distortion of the temporarily stored motion vector candidate, control updates the temporarily stored motion vector candidate and the distortion with the motion vector indicative of the position of the reference partial area in the reference field and the distortion. If the distortion obtained in step S12 larger than the distortion of the temporarily stored motion vector candidate, control proceeds to step S15, without updating the temporarily stored motion vector candidate and the distortion.

In step S15, control checks whether the reference partial area is the final reference partial area in the search window 319. If it is the final reference partial area, control returns to step S12 via step S16. If it is not the final reference partial area, control proceeds to step S17.

In step S16, control updates the reference partial area by shifting the reference partial area in the search window 319 half pixel by half pixel.

In step S17, control outputs the half-pixel precision field vector detected from the search window 319 for the partial area 203 of the input field 103 through the processing from step S11 to step S16. For instance, the motion vector 519 on the reference field 105 shown in FIG. 12C is outputted as the half-pixel precision field vector from the reference field 105 for the partial area 203 on the input field as shown in FIG. 11C.

In step S18, control checks whether the partial area 203 of the input field 103 at which the field vector is now being detected is the final input partial area in the input field. If it is not the final input partial area, control updates the partial reads of the input field 103 in step S19, returning to step S36 shown in FIG. If it is the final input partial area, control proceeds to step S20.

In step S20, control checks whether the field vector detection ends for a predetermined number of input fields constituting one frame. If does not end, control reads the succeeding input field in step S21, returning to step S02 shown in FIG. 7. If the field vectors of a predetermined number of input fields constituting ore frame have been detected, control proceeds to step S22. For instance, after the field vector of the partial area or the input field has been detected, control reads the succeeding input field 104 in step S21, and further reads the partial area 204 or the input field 104 (as shown in FIG. 11D) in step S02 shown in FIG. 7. For the partial area 204 on the input field 104, in the same way as with the case of the field vector detecting procedure for the partial area 203 on the input field 103, the field vectors are detected as follows:

In step S36 shown in FIG. 7, control forms a reduced input field. In the example shown in FIG. 11B, the reduce input field 108 is formed by sampling the input field 104. In this case, the input partial area 204 on the input field 104 corresponds to the reduced input partial area 208 on the reduced input field 103. Further, the reduced reference field is used in the same way as with the case of the motion vector detection for the input field 103. Therefore, when the same reduced reference field is being used, the reduced reference fields 109 and 110 can be kept stored in a memory; or whenever the input field is updated, the reduced reference field can be formed again.

In step S37, control sets the motion vector search windows 313 and 314 on the pictures of the reduced reference fields 109 and 110 as shown in FIGS. 12A and 12B, respectively, on the basis of the motion vector 511 indicative of the position of the reduced partial area and having the smaller distortion (between the reduced reference partial area and the reduced input partial area) in the two one-node precision field vectors previously obtained for the reduced partial area 207 on the reduced input field 107. Further, control stores the default motion vector candidate and the distortion for the reduced input partial area 208 temporarily for each search window.

Further, through step S38 to step S42 control detects one-node precision field vectors from the retrieval ranges 313 and 314, respectively. Further, in step S43, control outputs the two detected one-node precision field vectors (e.g., the motion vectors 513 and 514 on the reduced reference fields 109 and 110 in FIGS. 12A and 12B, respectively).

In step S44, control projects the one-node precision motion vectors 513 and 514 outputted in step S43 upon the non-reduced reference fields 105 and 106 as shown in FIGS. 12B and 12C, respectively.

In step S45 shown in FIG. 6, control sets the retrieval ranges 316 and 318 (each of whose sizes corresponds to the sampling ratio) by determining the partial areas 415 and 416 existing on the reference fields 105 and 106 indicated by the projected motion vectors 513 end 514 as their centers, respectively. Further, control stores temporarily the default motion vector candidates and the distortions for the preceding reduced input partial area 208 end the corresponding input partial area 204 for each reference field.

Further, in step S04 to step S08, control detects the one-pixel precision field vector from the search windows 316 and 316, respectively.

Further, in step S09, control outputs the obtained two one-node precision field vectors (e.g., the motion vectors 516 and 518 on the reference fields 105 and 106 in FIGS. 12C and 12D), respectively.

In step S10, control selects the motion vector having a smaller distortion between the partial area on the reference field and the partial area or the input field from the two one-pixel precision field vectors as the one-pixel precision field vector. In the example shown in FIG. 12, the motion vector 518 indicative of the partial area 419 on the reference field 106 is selected as the one-pixel precision field vector.

In step S11, in order to detect the half-pixel precision field vector, control sets the small vector search windows 320 by setting the reference partial area 419 as its center, and further stores temporarily the default vector candidate and the distortion for the input partial area 204.

Further, in FIG. 9, control executes the processing from step S12 to step S16 to detect the half-pixel precision field vector from the search window 320.

In step S17, control outputs the half-pixel precision field vector 520 obtained as the result of the above-mentioned search processing.

In step S18, control discriminates whether the partial area 204 of the input field (in which the field vector is now being detected) is the final input partial area of the input field. If it is not the final input partial area, in step S19, control updates the partial area of the input field 104, returning to the step S36 shown in FIG. 7. If it is the final input partial area of the input field, control proceeds to step S20.

In step S20, through the processing from step S36 to step S19, control checks whether the field vector detections have been completed for a predetermined number of input fields for constituting one frame (e.g., two input fields 103 and 104 as shown in FIGS. 11C and 11D). If not yet completed, in step S21, control reads the succeeding field (the input field 104 as shown in FIG. 11D), returning to step S02 for executing the processing of detecting field vectors for the succeeding input field. If completed, control proceeds to step S22.

Figure 11E:
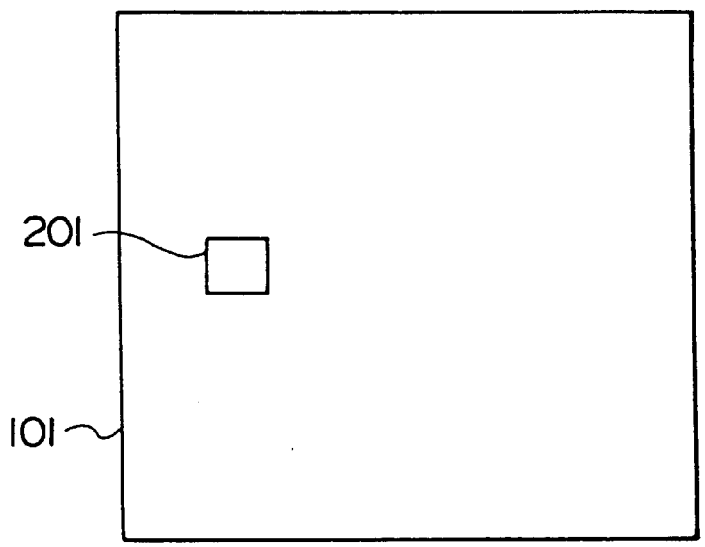
Figure 12E:
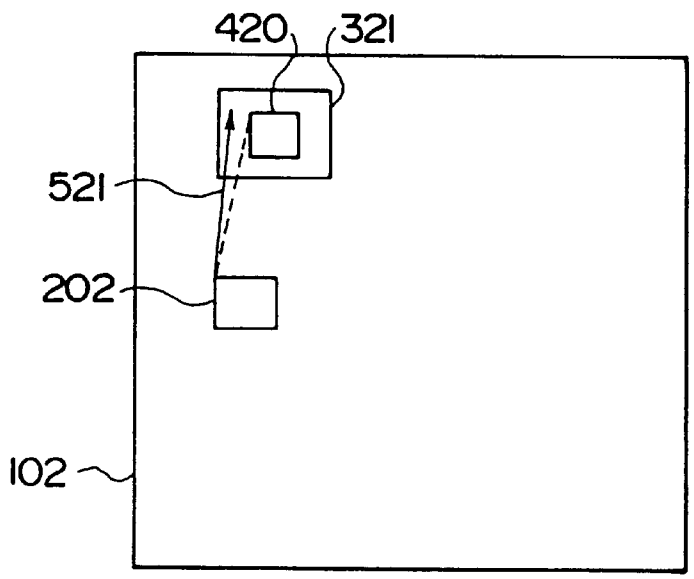

The method of detecting a motion vector for the partial area 201 on the input frame as shown in FIG. 11E on the basis of the reference frame 102 as shown in FIG. 12E will be described hereinbelow.

First, in step S22 in FIG. 9, control forms a single input frame and a signal reference frame on the basis of one set of the input fields and one set of reference fields read in steps S02 and S21. For instance the input frame 101 as shown in FIG. 11E can be formed by the two input fields 103 and 104 as shown in FIGS. 11C and 11D. Further, the reference frame 102 as shown in FIG. 12E can be formed by the two reference fields 105 and 106 as shown in FIGS. 11C and 11D.

Figure 10:
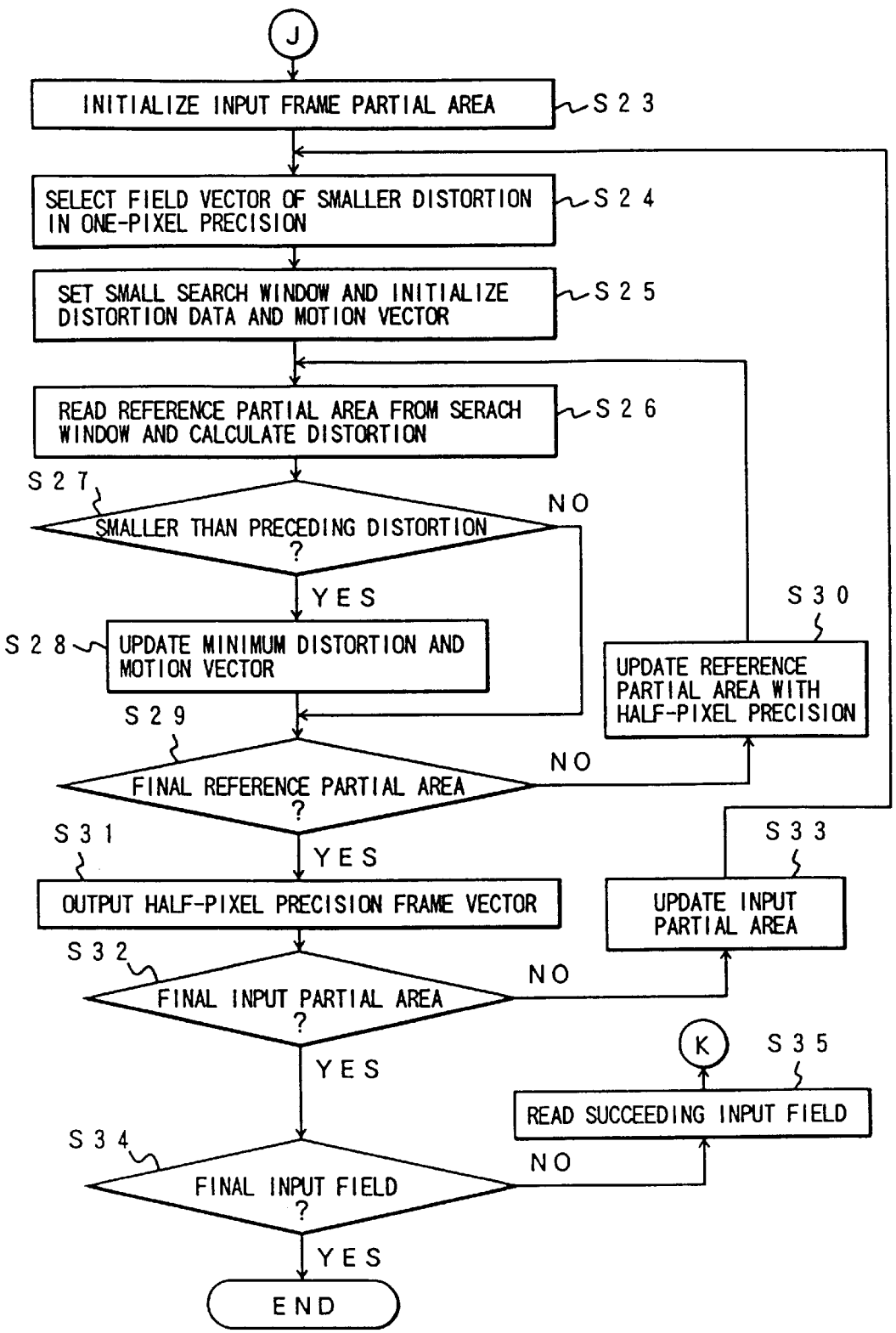

In step S23 in FIG. 10, control reads the partial area 201 on the input frame 101. The partial area on the frame picture read in this step is formed by two partial areas located at roughly the same positions on the two field pictures. For instance, the partial areas 201 on the input frame 101 as shown in FIG. 11E is formed by the two partial areas 203 and 204 on the two input fields 103 and 104 as shown in FIGS. 11C and 11D, respectively.

In step S24, control selects in one-pixel precision the field vector with a smaller distortion between the reference partial area and the input partial area, from the two one-pixel precision field vectors detected for the partial areas of two input fields for forming thee partial area on one input frame, as the search standard of the half-pixel precision frame vector. For instance, when the distortion between the reference partial area and the input partial area at the partial area on the reference field 105 (as shown in FIG. 12C) indicated by the one-pixel precision motion vector 515 detected for the partial area 203 on the input field 103 as shown in FIG. 11C is smaller than the distortion between both at the partial area on the reference field 106 (as shown in FIG. 12D) indicated by the one-pixel precision motion vector 518 detected for the partial area 204 on the input field 104 as shown in FIG. 11D, the motion vector 515 is selected as the search standard of the half-pixel precision frame vector.

In step S25, in order to detect the half-pixel precision frame vector, control converts the position on the reference field 105 indicated by the motion vector 515 into the position on the reference frame 102, and further sets a small motion vector search window 321 by setting the reference partial area 420 on the reference frame existing on the position as its center. In addition, control stores temporarily the motion vector candidate and the distortion for the input partial area 201.

In step S26, control cuts away the reference partial area from the search window 321, and calculates distortion between the reference partial area and the input partial area 201.

In steps S27 and S28, control compares the distortion obtained in step S26 with the distortion of the motion vector candidate previously stored for each reference partial area. If the distortion obtained in step S26 is equal to or less than the distortion or the temporarily stored motion vector candidate, the temporarily stored motion vector candidate and the distortion are updated with the motion vector indicative of the position of the reference partial area in the reference frame and the distortion. If the distortion obtained in step S26 is larger than the distortion of the temporarily stored motion vector candidate, control proceeds to step S29, without updating the temporarily stored motion vector candidate and the distortion.

In step S29, control checks whether the reference partial area is the final reference partial area of the search window 321. If it is not the final reference partial area, control returns to step S26 via step S30. If it is the final reference partial area, control proceeds to step S31.

In the above-mentioned step S30, control updates the reference partial area of the search window 321 by shifting the reference partial area in the search window half pixel by half pixel.

In step S31, control outputs the half-pixel precision frame vector (e.g.. the motion vector 521 on the reference frame 102 as shown in FIG. 12E) detected from the search window 321 for the partial area 201 of than input frame 101 through the above-mentioned procedure from step S25 to step S30.

In step S32, control checks whether the partial area 201 of the input frame 201 whose frame vector is now being detected is the final input partial area of the same input frame. If not the final input partial area, in step S33, control updates the partial area of the input frame 101, returning to step S24. If the final input partial area of the input frame, control proceeds to step S34.

In step S34, control checks whether the motion vectors have been detected for a predetermined number of input fields. If the motion vectors of a predetermined number of input fields have not yet been detected, control resets the previous input field in step S35 and reads the succeeding input field, returning to step S02 shown in FIG. 7. If the motion vectors of a predetermines number of input fields have all been detected, control ends the motion vector detecting processing for the same reference picture.

A third embodiment of the motion vector detecting system according to the present invention will be described hereinbelow with reference to a block diagram shown in FIG. 13.

First, the reference field 21 is inputted to a first field vector detector 1, and the reference field 23 is inputted to a second field vector detector 2. Further, the input field 21 to be coded is inputted to both the first field vector detector 1 and the second field vector detector 2. Separately, the one-pixel precision field vector 24 already detected to determine the search window is inputted through a delay circuit 4 to the first field vector detector 1 and the second field vector detector 2, respectively.

The first and second field vector detectors 1 and 2 operate in the same way, to search the inducted one-pixel precision field vectors on the reference fields, respectively. The circuit construction of each of these field vector detectors 1 and 2 is shown in detail in FIG. 14.

With reference to FIG. 14, the operation of the first field vector detector 1 will be described hereinbelow by way of example.

In FIG. 14, a search window setter 141 sets a search window for detecting the one-pixel precision field vector on the bases of the already detected field vector 24. The set search window data 43 is outputted to a reference field memory 143. Further, when the already-detected motion vector is not used to set the retrieval range, the search window setter 141 sets a search window for detecting a motion vector to a predetermined position on the reference field. The set search window data 43 is outputted to the reference field memory 143.

The reference field memory 143 stores the reference field 22, outputs the reference partial area data 45 in the search window indicated by the search window data 43 (inputted from the search window setter 141), and outputs the one-pixel precision position date 46 in the reference partial area on the picture to a minimum distortion detector 145.

On the other hand, an input field 21 is inputted to an input partial area memory 142. The input partial area memory 142 outputs the input partial area data 44 to a distortion calculator 144.

The distortion calculator 144 calculates distortion 47 between the inputted input partial area data 44 and the inputted reference partial area data 45, and outputs the calculated distortion 47 to the minimum distortion detector 145.

The minimum distortion detector 145 detects the position data 46 in the reference partial area which can minimize the distortion 47 in the search window, and outputs a motion vector 26 indicative of the position on the reference partial area on the picture and the minimum distortion 25.

As described above, the first field vector detector 1 obtains the one-pixel precision field vector 26 retrieved on the reference field 22, and the minimum distortion 25 at that time. These obtained data are inputted to the first motion vector discriminator 3 shown FIG. 13. In the same way, the field vector detector 2 obtains the one-pixel precision field vector 28 retrieved on the reference field 23, and the minimum distortion 27 at that time. These obtained data are also Inputted to the first motion vector discriminator 3.

The first motion vector discriminator 3 compares the inputted minimum distortion 25 with the minimum distortion 27, and selects the motion vector which can minimize the distortion between the input and reference partial areas from the two inputted one-pixel precision field vectors 26 and 28. The selected motion vector is outputted as the field vector 30. Further, at the same time, the minimum distortion 29 is outputted as the distortion 29. In addition, the select data 31 indicative of the reference field having a smaller distortion between the input and reference partial areas is also outputted. Further, the one-pixel precision field vector 30 is inputted as it is to a second motion vector discriminator 10 and the third field motion vector discriminator 9, and further delayed through a delay circuit 4 by a time required to detect one field motion vector as an already-detected motion vector 24. The delayed motion vector 24 is inputted to the first and second field vector detectors 1 and 2, respectively so as to be used to set the motion vector search windows for the succeeding input fields.

The select data 31 indicative of the reference field having a smaller distortion is inputted to a reference field selector 8. Further, the reference field data 22 is delayed by a delay circuit 5 by a time required to detect the one-pixel precision field vector in a single search window. The reference field data 32 delayed by this delay circuit 5 is also inputted to the reference field selector 8. In the same way, the reference field data 23 is also delayed by a delay circuit 6 by a time (the same as the delay time of the delay circuit 5), and the delayed reference data is also inputted to the reference field selector 8.

The reference field selector 8 selects one of the inputted reference field data 32 and the reference field data 33 on the basis of the inputted reference field select data 31, and outputs the selected reference field data as the reference field 35.

The reference field 35 is inputted to a third field vector detector 9. Further, the input field 21 is delayed by a delay circuit 7 by a time the same as that of the delay circuit 5. The delayed input field 34 is also inputted to the third field vector detector 9. Further, the one-pixel precision field vector 30 outputted from the first motion vector discriminator 3 is also inputted to the third field vector detector 9.

The third field vector detector 9 retrieves the half-pixel precision field vectors for the input partial area on the inputted input field 3, within a small search window determined by setting the position indicated by the inputted one-pixel precision field vector 30 to its center on the inputted reference field 35, and outputs the detected half-pixel precision field vectors 36.

The above-mentioned one-pixel precision field vector 30 and the minimum distortion 29 are both inputted to the second motion vector discriminator 10. The second motion vector discriminator 10 accumulates the one-pixel precision field vector 30 and the minimum distortion 29 for only one field, respectively, selects the one-pixel precision field vector having a smallest distortion between the input and reference partial areas from a plurality of one-pixel precision field vectors obtained for a plurality of respective input partial areas located at the same position on the picture, and outputs the selected one as the one-pixel precision field vector 37.

The outputted one-pixel precision field vector 37 is delayed by a delay circuit 13 by a time obtained to detect one field motion vector. The delayed one-pixel precision field vector 40 is inputted to a frame vector detector 15.

The input field 34 obtained by delaying the input field 21 through a delay circuit 7 by a time required to retrieve a one-pixel precision field vector in one search window is inputted to a frame memory 11. The frame memory 11 has a capacity for storing two fields. Therefore, an input frame 39 can be formed by writing a predetermined number (e.g., two in this case) of the input fields for constituting one frame. The input frame 39 is inputted to the frame vector detector 15.

Further, the reference fields 32 and 33 delayed through the delay circuits 5 and 7 (the same delay time by the delay circuit 7) by the same time, respectively are inputted to a frame memory 12. The frame memory 12 has a capacity for storing two fields. Therefore, a reference frame 38 can be formed by writing a predetermined number (e.g., two in this case) of the reference fields constituting one frame. The reference frame 38 is delayed through a delay circuit 14 by a time required to detect a field motion vector. The delayed reference frame 41 is inputted to the frame vector detector 15.

The half-pixel precision frame vector can be searched on the reference frame 41 by use of the frame vector detector 15.

FIG. 15 shows the frame vector detector 13. Here, the construction and the operation of the frame vector detector 15 will be described hereinbelow.

Here, a first position converter 151 converts the position on the reference field indicated by the already-inputted and detected one-pixel precision field vector 40 into the position on the reference frame, and outputs the converted position on the reference frame to a search window setter 152 as the frame vector 48.

The search window setter 152 sets the small search window for detecting the half-pixel precision frame vector on the basis of the inputted frame vector 48, and inputs the search window date 49 to a reference frame memory 154.

The reference frame memory 154 stores the reference frame 41, and outputs the reference partial area date 51 in the small search window indicated by the search window data 49 (inputted by the search window setter 152) to a distortion calculator 155. In addition, the reference frame memory 154 outputs the half-pixel precision position data 52 to a minimum distortion detector 156.

On the other hand, the input frame 39 is inputted to an input partial area memory 153. The input partial area memory 153 outputs the input partial area data 50 to a distortion calculator 155.

The distortion calculator 155 calculates the distortion between the inputted input partial area data 50 and the inputted reference partial area data 51 and outputs the calculated distortion 53 to the minimum distortion detector 156.

The minimum distortion calculator 156 detects the position data 52 which can minimize the distortion 58 in the search window, and outputs the half-pixel precision frame vector 42 indicative of the reference partial area position on the picture.

The fourth embodiment of the vector detector according to the present invention will be described hereinbelow with reference to FIG. 16.

The reference field 22 is inputted to a fourth field vector detector 161, and the reference field 23 is inputted to a fifth field vector detector 162.

Further, the input field 21 to be coded is inputted to the fourth and fifth field vector detectors 161 and 162, respectively.

Separately, the already-detected one-node precision field vector 55 required to set the search window is inputted to the fourth and fifth field vector detectors 161 and 162, respectively.

Figure 17:
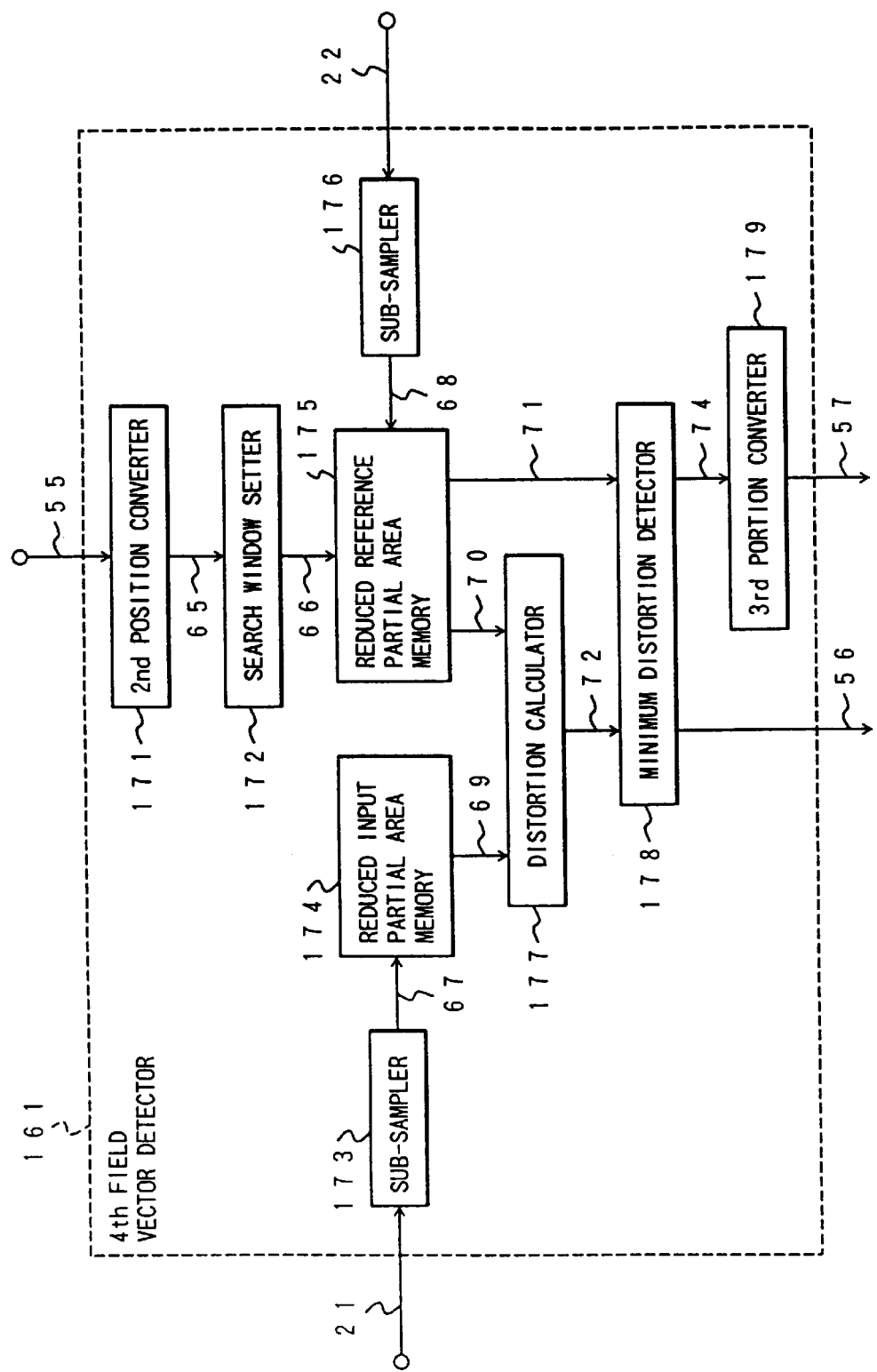
FIG. 17 is a detailed block diagram showing the fourth or fifth field vector detector shown in FIG. 16.

Operating in the same way, the fourth and fifth field vector detectors 161 and 162 retrieve the one-node precision field vectors on the inputted reference fields, respectively, which are constructed as shown in FIG. 17, respectively.

With reference to FIG. 17, the construction and the operation of the fourth field vector detector 161 will be explained hereinbelow by way of example.

Here, the already-detected field vector 55 is converted by a second position converter 171 into the motion vector 65 on the reduced reference field. Further, on the basis of the converted field vector 65, a search window setter 172 sets the search window for detecting the one-node precision field vector, and outputs the search window date 66 to a reduced reference field memory 175. Further, when the already-obtained motion vector is not used to set the retrieval range, the search window setter 172 sets a search window to a predetermined position on the reduced reference field to detect the motion vector. The search window data 66 is outputted to a reduced reference field memory 175.

The reduced reference field memory 175 stores the reduced reference field 68 (obtained by sampling the reference field 22 by a sub-sampler 176), and outputs the reduced reference partial area data 70 in the search window indicated by the search window data 66 (inputted from the search window setter 172) to a distortion calculator 177. Further, the reduced reference field memory 175 outputs the one-node precision position data 71 on the reduced picture of the reduced reference partial area to a minimum distortion detector 178.

On the other hand, the input field 21 is sampled by a sub-sampler 173, and the sampled input field 67 is inputted to a reduced input partial area memory 174. The reduced input partial area memory 174 outputs the reduced input partial area data 69 to the distortion calculator 177.

The distortion calculator 177 calculates a distortion between the inputted reduced input partial area data 69 and the reduced reference partial area date 70, and outputs the calculated distortion 72 to the minimum distortion detector 178.

The minimum distortion detector 178 detects the position date 71 in the reduced reference partial area having a minimum distortion 72 in the search window, and outputs the motion vector 74 indicative of the position in the reduced reference partial area on the reduced reference field and the minimum distortion 56. Further, the motion vector 74 indicative of the position on the reduced reference field is converted into a motion vector 57 on the non-reduced reference field by a third position converter 179.

Figure 16:
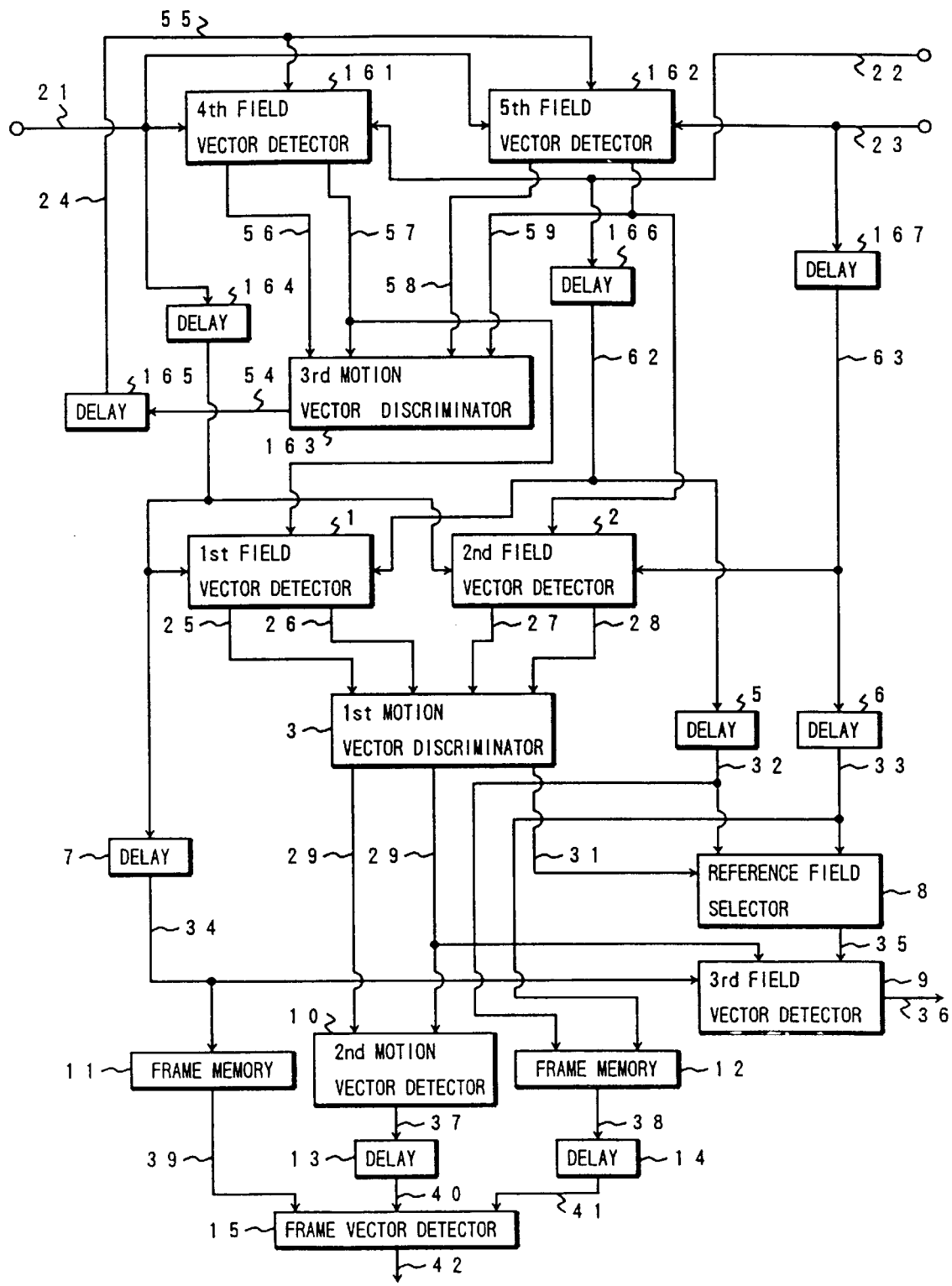
FIG. 16 is a block diagram showing a motion vector detector of the fourth embodiment according to the present invention.

As described above, the one-node precision field vector 57 (obtained by sampling the reference field 22 and searched on the reduced reference field) and the minimum distortion 56 at that time both obtained by the fourth field vector detector 161 are inputted to a third motion vector discriminator 163 shown in FIG. 16. In the same way, the one-node precision field vector 59 (obtained by sampling the reference field 23 and searched on the reduced reference field in the same way as with the case of the fourth field vector detector 151) and the minimum distortion 59 at that time both obtained by the fifth field vector detector 162 are inputted to the third motion vector discriminator 163. In addition, the one-node precision field vector 57 is also inputted to the first field vector detector 1, and the one-node precision field vector 59 is inputted to the second field vector detector 2.

The third motion vector discriminator 163 compares the inputted minimum, distortion 56 with the minimum distortion 58 to select the motion vector having a smaller distortion between the reduced input partial area and reduced reference partial area from the inputted one-node precision field vectors 57 and 59, and outputs the selected motion vector as the field vector 54. The one-node precision field vector 54 is delayed through a delay circuit 165 by a time required to detect the motion vector on one reduced field, and outputted as the already-detected motion vector 55 to the fourth and fifth field vector detectors 161 and 162, respectively. The motion vector 55 is used when the motion vector search window on the reduced field is set for the succeeding input field.

The one-node precision field vector 57 is inputted to the first field vector detector 1, and the one-node precision field vector 59 is inputted to the second field vector detector 2. Further, the input field 21 is delayed through a delay circuit 164 by a time required to detect the motion vector on one reduced field. The delayed input field 60 is inputted to the first and second field vector detectors 1 and 2, respectively. Further, the reference field 22 is delayed through a delay circuit 166 by a delay time the same as that of the delay circuit 164, and the delayed reference field 62 is inputted to the first field vector detector 1. Further, the reference field 23 is delayed through a delay circuit 167 by a delay time the same as that of the delay circuit 164, and the delayed reference field 63 is inputted to the second field vector detector 2.

The first field vector detector 1 searches, on the delayed reference field 62, the one-pixel precision field vector in the search window of a size determined according to the sub-sampling ratio and by setting the position indicated by the one-node precision field vector 57 on the picture as its center. In the same way, the second field vector detector 2 retrieves, on the delayed reference field 63, the one-pixel precision field vector in the search window of a size determined according to the sub-sampling ratio and by setting the position indicated by the one-node precision field vector 59 on the picture as its center.

The one-pixel precision field vector 26 obtained by the first field vector detector 1 and the minimum distortion 25 at that time are inputted to the first motion vector discriminator 3. Further, in the same way, the one-pixel precision field vector 28 obtained by the second field vector detector 2 and the minimum distortion 25 at that time are inputted to the first motion vector discriminator 3.

The first motion vector discriminator 3 compares the inputted minimum distortion 25 with the minimum distortion 27 to select the motion vector having a smaller distortion between the input partial area and reference partial area from the inputted one-pixel precision field vectors 26 and 28, and outputs the selected one as the field vector 30. Further, the minimum distortion at that time is outputted as the distortion 29. Further, the select data 31 indicative of the reference field of smaller distortion between the input and reference partial areas is also outputted. Further, the one-pixel precision field vector 30 is inputted as it is to the second motion vector discriminator 10 and the third field vector detector 9 as it is.

The select data 21 indicative of the reference field having a smaller distortion is inputted to a reference field selector 8. Further, the reference field data 62 already delayed through the delay circuit 166 by the time required to detect the motion vector on the reduced field is further delayed through a delay circuit 5 by a time required to search the one-pixel precision yield vector in one search window. The reference field data 32 delayed through this delay circuit 5 is also inputted to the reference field selector 8. In the same say, the reference field data 63 already delayed through the delay circuit 167 is further delayed through a delay circuit 6 (the same delay time as that of the delay circuit 5). The reference field data 33 delayed through this delay circuit 6 is also inputted to the reference field selector 8.

The reference field selector 8 selects one of the inputted reference field data 32 and the reference field data 33 on the basis of the inputted reference field select data 31, and outputs the selected one as the reference field 35.

The reference field 35 is inputted to the third field vector detector 9. Further, the input field date 60 already delayed through a delay circuit 164 by a time required to detect the motion vector on the reduced field is further delayed through a delay circuit 7 by the time same as that of the delay circuit 5. This delayed input field 34 is also inputted to the third field vector detector 9. Further, the one-pixel precision field vector 30 outputted by the first motion vector discriminator 3 is also inputted to the third field vector detector 9.

The third field vector detector 3 searches the half-pixel precision field vector for the input partial area on the inputted input wield 34, in the small search window determined by setting the position indicated by the inputted one-node precision field vector 30 on the inputted reference field 35 as its center. The detected half-pixel precision field vector 36 is outputted.

The above-mentioned one-pixel precision field vector 30 and the minimum, distortion 29 are both inputted to the second motion vector discriminator 10. The second motion vector discriminator 10 accumulates the one-pixel precision field vector 30 and the minimum distortion 29 for only one field, respectively, selects one-pixel precision field vector having a smallest distortion between the input and reference partial areas from a plurality of one-pixel precision field vectors obtained for a plurality of respective input partial areas located at the same position on the picture, and outputs the selected one as the one-pixel precision field vector 37.

The outputted one-pixel precision field vector 37 is delayed through the delay circuit 13 by a time required to detect one field motion vector. The delayed one-pixel precision field vector 40 is outputted to the frame vector detector 15.

The input field 34 delayed by a time required to retrieve a one-pixel precision field vector in one search window through the delay circuit 7 is inputted to a frame memory 11. The frame memory 11 has a capacity for storing two fields. Therefore, an input frame 39 can be formed by writing a predetermined number (e.g., two in this case) or the input fields of constituting one frame. The input frame 39 is inputted to the frame vector detector 15.

Further, the reference fields 32 and 33 delayed through the delay circuits 5 and 7, respectively by the same delay time as that of the delay circuit 7 are inputted to a frame memory 12. The frame memory 12 has a capacity for storing two fields. Therefore, a reference frame 38 can be formed by writing a predetermined number (e.g., two in this case) of the reference fields for constituting one frame. The reference frame 38 is delayed through a delay circuit 14 by a time required to detect a one field motion vector. The delayed reference frame 41 is inputted to the frame vector detector 15.

The frame vector detector 15 searches the half-pixel precision field vector on the reference frame 41, and outputs the detected half-pixel precision frame vector 42.

The method and system of detection motion vectors according to the present invention have been described as above. Without being limited only thereto, however, the present invention can be modified in various ways as far as: the motion vector is detected for the partial area formed by the input picture field; and the frame vector is obtained by detecting notion vectors for the partial area formed by the input picture frame within a search window determined on the basis of a position indicated by the obtained field vector on the reference picture. For instance, the motion vector for the partial area formed by the field is detected for each partial area formed by the frame, and the frame vector is obtained by detecting motion vectors for the partial area formed by the input picture frame within a search window determined on the basis of a position indicated by the obtained field vector on the reference picture.

Further, the present invention can be applied to fields and frames sampled in the horizontal direction as with the case of MUSE (multiple sub-Nyquist sampling encoding), for instance in the same way as the above-mentioned embodiments in which the non-sampled fields and framers are used.

Further, without being limited only to the embodiments described above, the present invention can be modified with respect to the processing procedure and the processing block arrangement, within the scope not departing from the gist of the present invention. For instance, in the fourth embodiment, it is possible to construct the fourth field vector detector 161 (the same as the fifth field vector detector 162) in such a way that the input field 21 can be directly inputted to the input partial area memory 174; the sub-sampler 173 is arranged so that the input partial area data 69 outputted by the input partial area memory 174 can be inputted thereto;

and the input partial area memory 174 is used in common with the input partial area memory 142 used in the third embodiment. Further, it is also possible to arrange the system in such a way that the reference field 22 can be directly inputted to the reference field memory 175; the sub-sampler 176 is arranged so that the reference partial area data 70 outputted by the reference partial area memory 175 can be inputted thereto; and the reference field memory 175 is used in common with the reference field memory 143 used in the third embodiment.

Further, in the first to fourth embodiments, fine precision field and frame vector retrieval methods and systems have been described, in which the motion vectors are detected on the basis of a field vector having the minimum distortion detected in relatively coarse precision. Without being limited only thereto, however, it is also possible to construct the invention in such a way that fine precision field and frame vector searches can be executed on the basis of a plurality of field vectors detected in a coarse precision.

What is claimed is:

1. A method of detecting field motion vector data representative of motion of a partial area of an input field picture from any area of a reference field picture, and of detecting frame motion vector data representative of motion of an input frame picture including a plurality of input field pictures from any area on a reference frame picture, comprising the steps of:

detecting a first field motion vector from a position of a partial area of the reference field picture at which distortion between the partial area of the reference field picture and a partial area of a first input field picture has a minimum value;

detecting a second field motion vector from a position of a partial area of the reference field picture at which distortion between the partial area of the reference field picture and a partial area of a second input field picture has a minimum value;

determining initial data for detecting said frame motion vector data on the basis of said first field motion vector data and said second field motion vector data; and processing said initial data to detect said frame motion vector data from a position of a partial area of the reference frame picture at which distortion between the partial area of the reference frame picture and a partial area of the input frame picture has a minimum value, wherein a position of the partial area of the reference field picture at which said first distortion has a minimum value is determined by setting a position of the partial area of the reference field picture detected for the preceding field picture as its center such that a position of the partial area of the reference field picture at which the first distortion between the partial area of the input field picture and the partial area of the reference field picture has a minimum value is detected.

2. The method of detecting motion vector data according to claim 1, wherein a time interval between the input field pictures to be detected on the basis of the vector of the preceding field is a half of a time interval determined on the basis of the frame vector of the preceding frame, and the range of the search window required to detect the motion vector is a half in both horizontal and vertical directions so that the area of the search window is reduced by a factor of four.

3. The method of detecting motion vector data according to claim 1, wherein the search window is fixed between the two reference field pictures.

4. The method of detecting motion vector data according to claim 1, wherein when motion of the picture is small, two field vectors for one macro-block are detected from an overlapped area of search windows for the two field vectors, so that a high precision frame vector can be detected, even if only the frame vector close to any one of the two field vectors of the one macro-block is searched.

5. The method of detecting motion vector data according to claim 1, wherein the motion vector is obtained by detecting the frame vectors from a narrow search window determined by setting the frame vector detection position as a central position of the search window.

6. The method of detecting motion vector data according to claim 5, wherein the motion vector is obtained by detecting the frame vectors from a narrow search window determined by setting the field vector of less distortion between two field vectors detected for one macro-block as the central position of the search window.

7. A system for detecting field motion vector data representative of motion of a partial area of an input field picture from any area of a reference field picture, and for detecting frame motion vector data representative of motion of an input frame picture including a plurality of input field pictures from any area on a reference frame picture, comprising:

means for calculating a first distortion between a partial area of a first input field picture and partial areas of a reference field picture;

means for detecting a first field motion vector from a position of a partial area of the reference field picture at which said first distortion has a minimum value;

means for calculating a second distortion between the partial area of the reference field picture and a partial area of a second input field picture, means for detecting a second field motion vector from a position of a partial area of the reference field picture at which said second distortion has a minimum value;

means for determining initial data for detecting said frame motion vector data on the basis of said first field motion vector data and said second field motion vector data;

means for calculating a third distortion between a partial area of a frame in the search window and a partial area of a frame of the input picture; and means for processing said initial data to detect said frame motion vector data from a position of the partial area of the frame of the reference frame picture at which the third distortion has a minimum value, wherein said means for detecting a position of a partial area of the reference field picture at which said first distortion has a minimum value comprises means for setting a position of the partial area of the reference field picture detected for the preceding field picture as its center, whereby a position of the partial area of the reference field picture at which the first distortion between the partial area of the input field picture and the partial area of the reference field picture has a minimum value is detected.

8. The system of detecting motion vector data according to claim 7, wherein a time interval between the input field pictures to be detected on the basis of the vector of the preceding field is a half of a time interval determined on the basis of the frame vector of the preceding frame, and the range of the search window required to detect the motion vector is a half in both horizontal and vertical directions so that the area of the search window is reduced by a factor of four.

9. The system of detecting motion vector data according to claim 7, wherein the search window is fixed between the two reference field pictures.

10. The system of detecting motion vector data according to claim 7, wherein when motion of a picture is small, two field vectors for one macro-block are detected from an overlapped area of search windows for the two field vectors, so that a high precision frame vector can be detected, even if only the frame vector close to any one of the two field vectors of the one macro-block is searched.

11. The system of detecting motion vector data according to claim 7, further comprising:

means for detecting the frame vectors from a narrow search window determined by setting the frame vector detection position at a central position of the search window.

12. The system of detecting motion vector data according to claim 7, further comprising:

means for detecting the frame vectors from a narrow search window determined by setting the field vector of less distortion between two field vectors detected for one macro-block as the central position of the search window.

13. A method of detecting frame motion vector data representative of an area of a reference frame picture from which a partial area of an input frame picture is moved, comprising the steps of:

obtaining a plurality of first distortions between a partial area of a first input field picture and partial areas of a reference field picture by shifting the partial area of the first input field picture within a search window;

detecting a first field motion vector from a position of a partial area of the reference field picture having a minimum of said first distortions;

obtaining a plurality of second distortions between a partial area of a second input field picture and partial areas of the reference field picture by shifting the partial area of the second input field picture within a search window;

detecting a second field motion vector from a position of a partial area of the reference field picture having a minimum of said second distortions;

determining initial data for detecting said area of said reference frame picture on the basis of said first field motion vector data and said second field motion vector data;

obtaining a plurality of third distortions between partial areas formed by a reference frame picture and a partial area formed by an input frame picture by shifting the partial area within a search window; and processing said initial data to detect a position of a partial area of the reference frame picture having a minimum of said third distortions to detect a motion vector for the frame.

14. A system for detecting frame motion vector data representative of an area of a reference frame picture from which a partial area of an input picture is moved, comprising:

means for calculating a plurality of first distortions between a partial area of an input field picture and partial areas of a reference field picture by shifting the partial area within a search window;

means for detecting a first field motion vector from a position of a partial of the reference field picture having a minimum of said first distortions;

means for calculating a plurality of second distortions between a partial area of a second input field picture and partial areas of the reference field picture by shifting the partial area of the second input field picture within a search window;

means for detecting a second field motion vector from a position of a partial area of the reference field picture having a minimum of said second distortions;

means for determining initial data for detecting said area of said reference frame picture on the basis of said first field motion vector data and said second field motion vector data;

means for calculating a plurality of distortions between partial areas formed by a frame within the search window and a partial area formed by a frame of the input picture, by shifting the partial area in the search window; and means for processing said initial data to detect a position of a partial area formed by a reference picture frame, at which distortion is minimized, to detect a motion vector for the frame.

* * * * *